(12) United States Patent
Tamura et al.

(10) Patent No.: US 7,039,728 B2
(45) Date of Patent: May 2, 2006

(54) INFORMATION PROCESSING DEVICE AND METHOD

(75) Inventors: Misako Tamura, Mishima (JP); Hisaharu Takeuchi, Odawara (JP); Noboru Furuumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 49 days.

(21) Appl. No.: 10/803,204

(22) Filed: Mar. 17, 2004

(65) Prior Publication Data

US 2005/0076162 A1    Apr. 7, 2005

(30) Foreign Application Priority Data

Oct. 7, 2003    (JP) .............................. 2003-347942

(51) Int. Cl.
*G06F 3/00*    (2006.01)
(52) U.S. Cl. .................. 710/5; 710/6; 710/25; 711/167
(58) Field of Classification Search .................... 710/5, 710/6, 25; 711/167
See application file for complete search history.

(56) References Cited

U.S. PATENT DOCUMENTS

| | | |
|---|---|---|
| 5,339,449 A | 8/1994 | Karger et al. |
| 5,638,537 A | 6/1997 | Yamada et al. |
| 5,640,596 A | 6/1997 | Takamoto et al. |

(Continued)

FOREIGN PATENT DOCUMENTS

JP    03-008041    1/1991

(Continued)

OTHER PUBLICATIONS

Basener et al. "Performance Considerations for a Cascaded FICON Director Environment Version 0.2X," IBM Corporation Somers, NY (Mar. 2003).

(Continued)

*Primary Examiner*—Henry W. H. Tsai
*Assistant Examiner*—Niketa I Patel
(74) *Attorney, Agent, or Firm*—Townsend and Townsend and Crew LLP

(57) ABSTRACT

The value relating to the average of the length of processing time required to process a plurality of information sets is reduced. In one embodiment, an information processing device comprises: a receiving component receiving information elements contained in respective information sets having one or more information elements; an information processing component carrying out processing of the information elements thus received; and a determining component determining a processing sequence for the two or more information sets or the plurality of information elements, and determining a processing sequence different from the reception sequence, in which a value relating to the average of the length of processing time for the two or more information sets becomes equal to or less than the value that would be obtained were the plurality of information elements or the two or more information sets to be processed in accordance with their reception sequence.

21 Claims, 11 Drawing Sheets

U.S. PATENT DOCUMENTS

| | | | |
|---|---|---|---|
| 5,761,515 A | 6/1998 | Barton, III et al. | |
| 6,115,646 A * | 9/2000 | Fiszman et al. | 700/181 |
| 6,237,046 B1 | 5/2001 | Ohmura et al. | |
| 6,298,418 B1 | 10/2001 | Fujiwara et al. | |
| 6,311,256 B1 * | 10/2001 | Halligan et al. | 711/158 |
| 6,434,631 B1 * | 8/2002 | Bruno et al. | 710/6 |
| 6,516,385 B1 | 2/2003 | Satoyama et al. | |
| 6,553,476 B1 | 4/2003 | Ayaki et al. | |
| 6,715,006 B1 | 3/2004 | Hotta et al. | |
| 6,898,665 B1 * | 5/2005 | Megiddo | 711/113 |
| 2001/0008007 A1 * | 7/2001 | Halligan et al. | 711/114 |
| 2001/0034801 A1 | 10/2001 | Koyama | |
| 2004/0015654 A1 | 1/2004 | Furuumi et al. | |
| 2004/0210711 A1 * | 10/2004 | Kakihara et al. | 711/112 |
| 2004/0215878 A1 | 10/2004 | Takata et al. | |
| 2004/0255055 A1 * | 12/2004 | Lamberts | 710/5 |
| 2005/0021921 A1 * | 1/2005 | Blackmon et al. | 711/168 |

FOREIGN PATENT DOCUMENTS

| | | |
|---|---|---|
| JP | 2002-140233 | 5/2002 |

OTHER PUBLICATIONS

Merrit et al. "z/OS Support for the IBM TotalStorage Enterprise Storage Server," IBM Systems Journal 42:280-301 (Feb. 2003).

Ross "FICON I/O Measurements: Everything You Know is Wrong," Performance Associates, Inc. Pagosa Springs, CO (Feb. 2002).

* cited by examiner

FIG. 4
CONSIDERATION (2) OF RESPONSE TIME WHEN PROCESSING A PLURALITY OF I/O REQUESTS (SEQUENTIAL PROCESSING AND MULTIPLE PROCESSING)
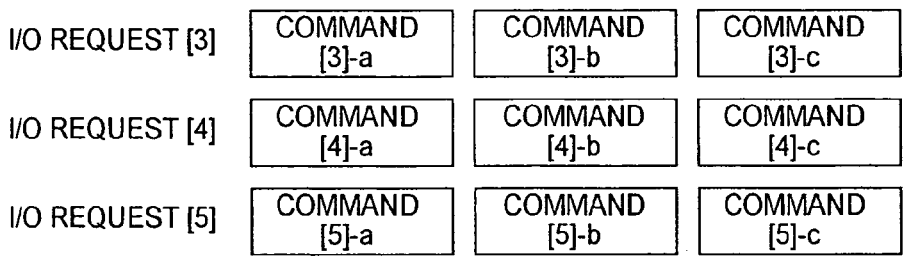
CASE 3-A: SEQUENTIAL PROCESSING FOR EACH I/O REQUEST
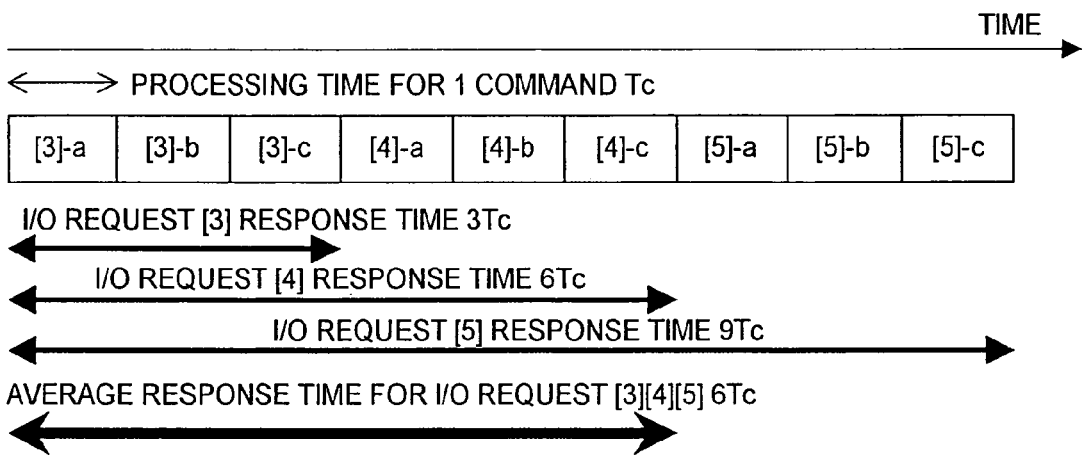
CASE 3-B MIXED PROCESSING OF A PLURALITY OF I/O COMMANDS
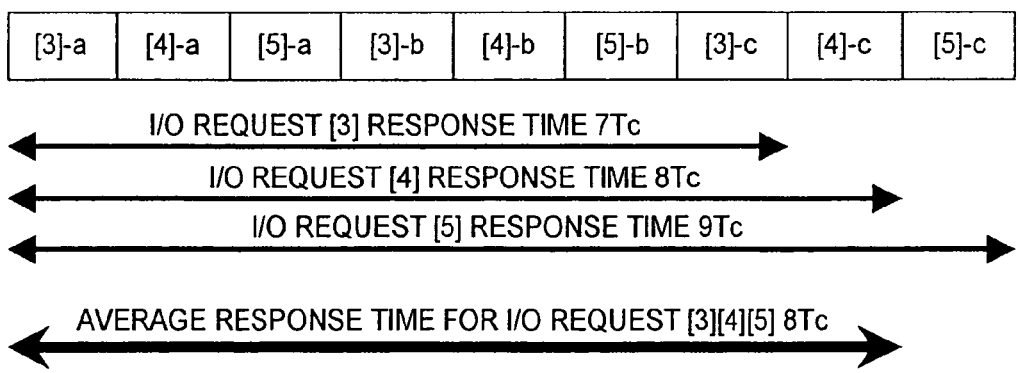

FIG. 5
CONSIDERATION (2) OF RESPONSE TIME FOR PLURALITY OF I/O REQUESTS
(PROCESSING SEQUENCE)
TIME TAKEN TO PROCESS I/O REQUEST [6] 2T
TIME TAKEN TO PROCESS I/O REQUEST [7] 1T
CASE 4-A: PROCESSED IN SEQUENCE I/O REQUEST [6][7]
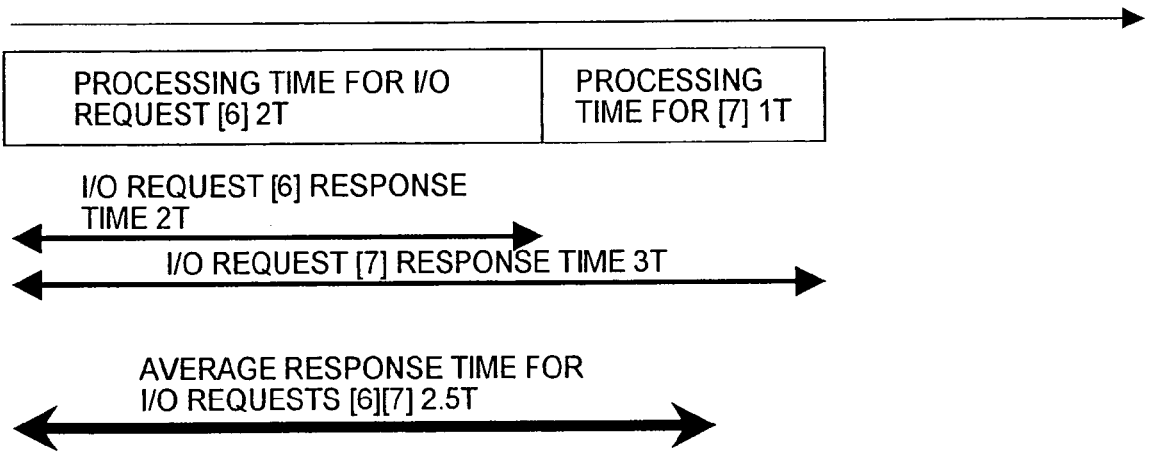
CASE 4-B: PROCESSING IN SEQUENCE I/O REQUEST [6][7]
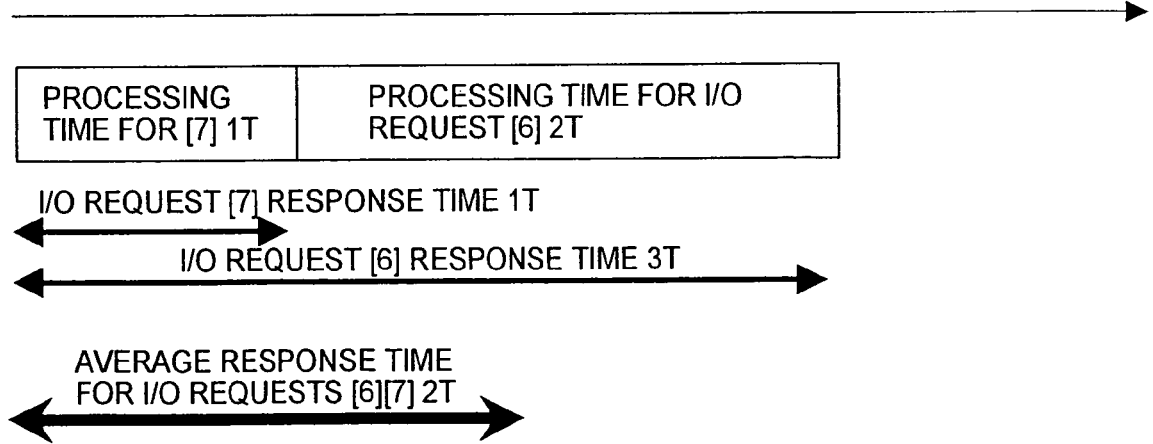

FIG. 6

TABLE SPECIFICATIONS IN SHARED MEMORY 106

1060

| COMMAND PROCESSING TIME ||
|---|---|
| COMMAND TYPE | EXPECTED PROCESSING TIME ($\mu$ sec) |
| COMMAND [1] | T1 |
| COMMAND [2] | T2 |
| COMMAND [3] | T3 |
| ⋮ | ⋮ |
| COMMAND n | Tn |

1060A

| DATA TRANSFER PROCESSING TIME |||
|---|---|---|
| TRANSFER TYPE / TRANSFER LENGTH (byte) || EXPECTED PROCESSING TIME ($\mu$ sec) |
| READ PROCESSING | DATA LENGTH a | Ta |
| | DATA LENGTH b | Tb |
| | ⋮ | ⋮ |
| | | Tx |
| WRITE PROCESSING | DATA LENGTH a | Ta |
| | DATA LENGTH b | Tb |
| | ⋮ | ⋮ |
| | DATA LENGTH x | Tx |

| | | | | 109,110 |

| I/O REQUEST BUFFER | | | | | |
|---|---|---|---|---|---|
| I/O REQUEST 1 | I/O REQUEST 2 | I/O REQUEST 3 | I/O REQUEST 4 | ... | I/O REQUEST N |
| EXECUTION SEQUENCE INFORMATION | EXECUTION SEQUENCE INFORMATION | EXECUTION SEQUENCE INFORMATION | EXECUTION SEQUENCE INFORMATION | | EXECUTION SEQUENCE INFORMATION |
| COMMAND a | COMMAND a | COMMAND a | - | | - |
| DATA a | DATA a | DATA a | - | | - |
| COMMAND b | COMMAND b | COMMAND b | - | | - |
| DATA b | DATA b | DATA b | - | | - |
| COMMAND c | - | COMMAND c | - | | - |
| DATA c-1 | - | DATA c-1 | - | | - |
| DATA c-2 | - | DATA c-2 | - | | - |
| DATA c-3 | - | - | - | | - |
| . | . | . | . | | . |
| . | . | . | . | | . |
| . | . | . | . | | . |

NUMBER OF I/O REGISTERED

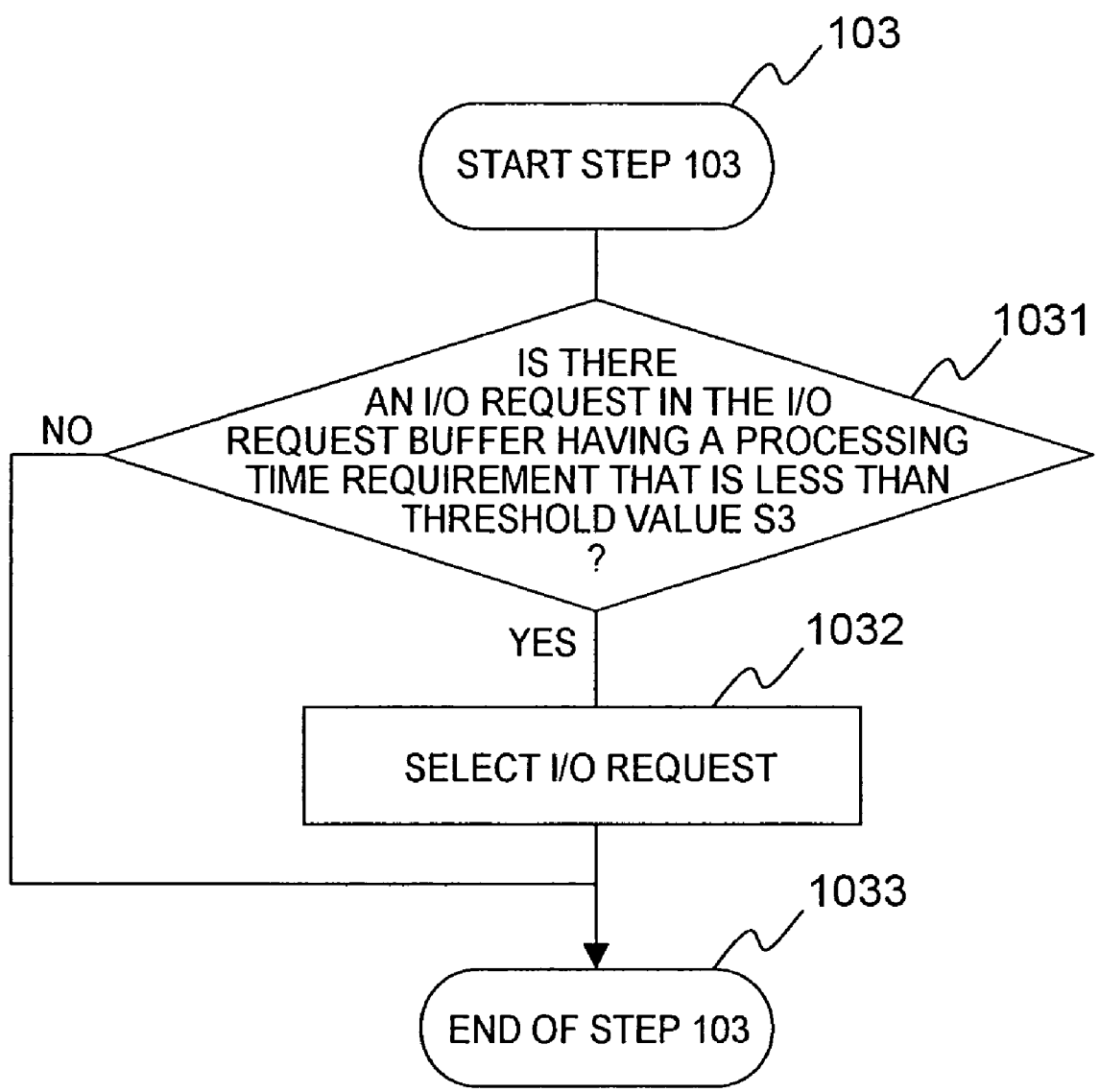

INFORMATION PROCESSING DEVICE AND METHOD

CROSS-REFERENCE TO RELATED APPLICATIONS

This application relates to and claims priority from Japanese Patent Application No. 2003-347942 on Oct. 7, 2003, the entire disclosure of which is incorporated herein by reference.

BACKGROUND OF THE INVENTION

1. Field of the Invention

The present invention relates to technology for processing an information set having one or more information elements, and more specifically, to technology for processing an I/O request received from an external device in accordance with a protocol such as an ESCON or FICON, or the like, for example.

2. Description of the Related Art

The information set having one or more information element may be, for example, a command element set having one or more command element which may be a command or data. A concrete example is a command element set exchanged under the ESCON (Enterprise Systems Connection) communications protocol, which is known as a CCW chain.

A CCW chain, for example, is an I/O request issued by a host to a storage system, in a case where an host and a storage system comprising a data storage device and a storage control device for same (for example, a RAID (Redundant Array of Independent Inexpensive Disks) system) are connected on the basis of the ESCON protocol.

The I/O request may contain a read command for reading data from a data storage device, for example, (in other words, a read request), or it may contain a write command for writing data to a data storage device (in other words, a write command). The storage control device in the storage system has a cache memory, and reading and writing of data between the host and the data storage device is carried out via this cache memory. More specifically, for example, when the memory control device has received a read request from the host, then if the read request data which is required by the read request is present in the cache memory (in the event of a "cache hit"), then this read request data is sent to the host, whereas if it is not present in the cache memory (in the event of a "cache miss"), then processing is carried out for accessing the data storage device, reading out the read request data, and storing same in the cache memory (hereinafter, this is called a "staging process"), whereupon the read request data is then sent to the host. Moreover, when the storage control device has received a write request, if the target data is present in the cache memory corresponding to this write request (if there is a "cache hit"), then the write request data according to that write request is overwritten to that cache memory region, whereupon the data is stored in the data storage device, whereas if the target data is not present in the cache memory region (if there is a "cache miss"), then staging processing is carried out for accessing the data storage device, reading the target data and storing same in the cache memory region, whereupon the write request data is overwritten to the aforementioned region of the cache memory, and the overwritten data is then sent to the data storage device.

Upon completing a series of processes in response to the I/O request, the memory control device sends a completion notification indicating that this processing has been completed, to the host, in accordance with the ESCON protocol.

One aspect used to evaluate the performance of a storage control device of this kind is the length of time it takes for the host to receive this completion notification, after it has issued an I/O request (hereinafter, this is referred to as the "I/O response time".) Usually, it is assumed that the shorter the I/O response time, the better the performance of the storage control device. The I/O response time for any one I/O request is generally longer in the case of a cache miss than in the case of a cache hit. This is because the time taken to access the data storage device, typically, a magnetic disk, is longer than the time taken to access the cache memory.

Technology aimed at reducing this response time includes, for example, that disclosed in Reference Patent 1 (Japanese Patent Laid-open No. 2002-140233). According to this technology, for example, of a plurality of I/O requests received from an host, the storage control device carries out data transfer to the host in respect of those I/O requests which produce "hits" in the cache, and executes parallel processing for reading corresponding data from the data storage device to the cache memory, and then transferring this data to the host, in respect of I/O requests which produce "misses" in the cache. As a result, the completion notification sequence sent by the memory control device to the host in respect of processing a plurality of I/O requests, may be different from the sequence in which the I/O requests were received from the host.

SUMMARY OF THE INVENTION

Therefore, when evaluating the capacity of a storage control device on the basis of the length of the I/O response time as described above, it is necessary to take into account the average value of the I/O response times for a plurality of issued I/O requests (hereinafter, referred to as "average response time"). This is because, for instance, if the storage control device receives a first and a second I/O request from the host, then even if the I/O response time is short for the first I/O request, if the I/O response time is considerably longer in respect of the second I/O request, then the storage control device will not in fact achieve a short I/O response time in an overall sense. In the technology disclosed in Japanese Patent Laid-open No. 2002-140233 described above, no processing is carried out which takes the average response time into account.

The aforementioned problem is not limited to the I/O request as described above, but may also exist in other devices which receive and process information sets having one or more information element. Moreover, the aspect for evaluating the capacity of such devices is not limited to the average response time, and the average processing time required for a plurality of other processes may also be used for such evaluation.

Therefore, the object of the present invention is to make it possible to reduce the value relating to the average of the processing times taken to process a plurality of information sets.

BRIEF DESCRIPTION OF THE DRAWINGS

FIG. 4 shows a second consideration of response time in the processing of a plurality of I/O requests (consideration of average response time);

FIG. 5 shows a third consideration of response time in the processing of a plurality of I/O requests (average response time);

FIG. 6 shows one example of an information characteristics table 1060 in a shared memory 106;

FIG. 7 shows an I/O request buffer 109;

FIG. 11 shows a specific processing flow for step S103 in the processing flow illustrated in FIG. 10.

DESCRIPTION OF THE PREFERRED EMBODIMENTS

Figure 1:
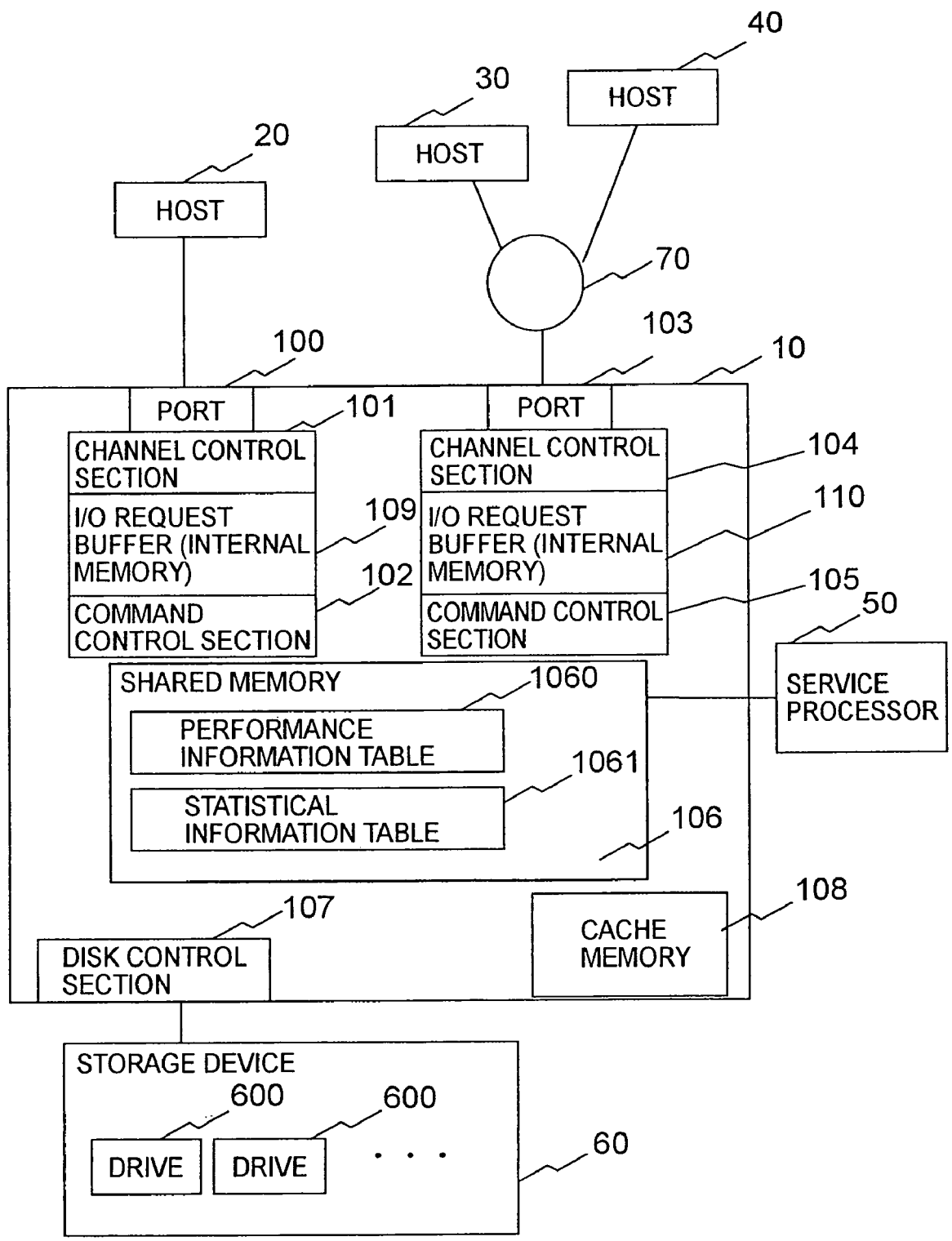
FIG. 1 shows the general composition of a storage system in which an information processing device relating to one embodiment of the present invention is applied.

The information processing device according to the present invention comprises: a receiving component receiving information elements contained in respective information sets having one or more information elements, from one or a plurality of information setting sources issuing such information sets; an information processing component processing the information elements thus received; and a determining component determining a processing sequence for two or more information sets or for the plurality of information elements thus received, on the basis of the plurality of information element which are unprocessed or currently being processed, contained in two or more information sets, and setting a processing sequence different from the reception sequence, in which a value relating to the average of the processing times for the two or more information sets becomes lower than the value achieved if the plurality of information elements or the two or more information sets were to be processed in accordance with the sequence in which they were received; wherein the information processing component starts processing of the plurality of information elements that are currently unprocessed or being processed, on the basis of the processing sequence thus determined.

Here, an "information element" is an element of information contained in an information set, being an element sent or received in a prescribed unit, for example, a frame unit, one concrete example of such an element being a command or data.

Moreover, an "information set" is a group of information elements containing one or more of such information elements, for example, a command data set containing at least one or more command and/or one or more data item. Furthermore, the one or more information elements contained in the information set must be processed sequentially according to a prescribed sequence, for example, and by processing them in this fashion, the processing for one information set is completed. Therefore, for example, when the determining component sets a processing sequence for two or more information sets or for a plurality of information elements as described above, essentially, it never sets a processing sequence in which a second information element which is to be processed after a first information element is in fact processed before the first information element.

Moreover, the value relating to the average of the processing times of two or more information sets is the average value of the two or more processing times relating to same, or it may be a value that is deducible from this average value (for example, the total value).

Furthermore, the "processing time" for each of the two or more information sets is, for example, the length of time from a prescribed time point (for example, the current time) until the time point relating to completion of the processing for that information set. The "time point relating to the completion of the processing" is, for example the time point at which the information processing device transmits a completion notification indicating completion of processing, to the information setting source, or the time point at which this completion notification is received by the information setting source and acknowledged by same, or the time point at which the information processing device transmits a prescribed response signal in response to this completion notification, or the time point at which the information processing device receives and acknowledges this response signal.

The information processing device according to the present invention may be constituted by at least one of hardware, software and/or a combination thereof. If the information processing device is constituted by software or a combination of software and hardware, then the computer program for realizing the software can be installed or loaded in a computer by means of a program storage medium such as a disk type storage or semiconductor memory, or the like, or by means of a communications network, such as the Internet, or the like, whereby the information processing device described above can be constituted.

The information processing device according to the present invention determines a processing sequence that is different to the reception sequence, on the basis of a plurality of information elements which are unprocessed or currently being processed contained in two or more information sets received by the information processing device, in which a value relating to the average of the processing times of the two or more information sets is less than the value that would be obtained if the plurality of information elements or the two or more information sets were processed according to the sequence in which they were received, and the information processing device initiates processing of the aforementioned plurality of information elements which are unprocessed of currently being processed, on the basis of the determined sequence. Thereby, it is possible to make the value relating to the average of the processing times for two or more information sets less than the value that would be obtained simply by processing the information in the same order in which it was received.

Below, an embodiment of the present invention is described with respect to the drawings.

FIG. 1 shows the general composition of a storage system in which an information processing device relating to one embodiment of the present invention is applied.

The storage system according to the present embodiment comprises one or a plurality of storage devices 60 and a storage control device 10.

The storage device 60 is a device capable of storing data, for example, a system comprising a group of hard disks wherein a plurality of disk drives, 600, 600, . . . each respectively comprising a plurality of hard disks, are disposed in an array (a storage system of this kind therefore being known as a so-called RAID (Redundant Array of Independent Inexpensive Disks)). A plurality of logical volumes (logical units) which are logical storage regions can be established in the physical storage regions of the plurality of disk drives 600, 600, . . . of the storage device 60.

The storage control device 10 comprises connection ports, 100, 103, channel control sections 101, 104, I/O request buffers 109, 110, command control sections 102, 105, a service processor 50, a shared memory 106, a cache memory 108, and a disk control section 107.

The connection ports 100, 103 are ports for connecting one or a plurality of external devices, such as a computer for example, to the storage control device 10, in such a manner that it can communicate with same. For example an host 20 is connected in a communicable fashion to the connection port 100, and an host 30 and host 40 are connected in a communicable fashion to the other connection port 103, via a director 70. Thereby, the storage control device 10 is able to receive I/O requests (input output requests) issued by the respective hosts 20, 30, 40, by means of the connection ports 100 or 103.

The channel control sections 101 and 104 are substantially the same in functional terms, and therefore the channel control section 101 is described as a representative example. The channel control section 101 may be constituted by a hardware circuit, by software, or by a combination of same, and it is connected in a communicable fashion to the host 20 connected to the connection port 100, which is positioned at a superior level. The channel control section 101 stores I/O requests received from the host 20 in the I/O request buffer 109, which can be accessed by the command control section 102 situated at an inferior level to the channel control section 101. Moreover, the channel control section 101 transmits data based on an I/O request received from the host 20, to the host 20, and receives same from the host 20.

The I/O request buffers 109 and 110 are substantially the same in functional terms, and therefore the I/O request buffer 109 is described as a representative example. The I/O request buffer 109 is a buffer capable of storing I/O requests received from the host 20 by the channel control section 101 situated at a superior level to the I/O request buffer 109, and it is guaranteed a prescribed region of internal memory (for example, a RAM or SD-RAM, or the like).

The command control sections 102 and 105 are substantially the same in functional terms, and therefore the command control section 102 is described as a representative example. The command control section 102 may be constituted by a hardware circuit, by software, or by a combination of same, and it reads out an I/O request stored in the I/O request buffer 109 situated at a superior level, and carries out processing in accordance with that I/O request.

The service processor 50 is an input processing device for inputting a variety of information to the storage control device 10 from a prescribed data source (for example, an external hard disk device or a portable non-volatile memory), or from a user, and it may be constituted by a hardware circuit, by software, or by a combination of same. More specifically, for example, the service processor 50 is a user interface, such as an operating panel, or the like, and by means of this user interface, a user may input prescribed information, for example, information for task instructions relating to the saving of data on the storage control device 10, various types of control parameters, various types of tuning parameters, and information relating to a performance information table 1060, described hereinafter. The various information input from the service processor 50 is stored in the shared memory 106, and is referenced or updated according to requirements, by the various control sections 102, 107, and the like, of the storage control device 10.

The shared memory 106 is, for example, a non-volatile semiconductor memory (for example, an EEPROM) or a memory provided provisionally on a hard disk, which is shared by the command control sections 102, 105, and the disk control section 107. A performance information table 1060 and a statistics information table 1061 as described hereinafter are provided in the shared memory 106 (the methods for updating and to utilizing the performance information table 1060 and the statistics information table 1061 are described hereinafter). Moreover, other prescribed information, for example, a control table required for processing of I/O requests, is provided in the shared memory 106. A control table is, for example, provided for each physical or logical storage region (hereinafter, referred to as "data storage region") on the one or more storage devices 60, and each control table stores the address of one or a plurality of virtual storage regions constituted by a cache memory 108 (hereinafter, referred to as a "cache slot"), the address of the data storage region, the type of I/O request (for example, whether a read or write operation has been requested), and the like. The reading or writing of data, from or to a cache slot on the cache memory 108 or one of the respective data storage regions is carried out on the basis of information recorded in the control table corresponding to that data storage region. An I/O request contains prescribed information (for example, the address of a data storage region), in such a manner that the control table to be used when processing that I/O request can be identified from this information.

The cache memory 108 is, for example, a volatile or non-volatile semiconductor memory (for example, an SRAM or EEPROM), which is shared by the command control sections 102, 105 and the disk control section 107. Data read from the storage device 60, or data to be written to the storage device 60 is stored temporarily in the cache memory 108. More specifically, for example, one cache slot is established in the cache memory 108 for one data storage region (for example, a logical volume), by a prescribed control section (for example, the command control section 102, 105), and the data to be written to the data storage region corresponding to that cache slot, or the data read from that data storage region, is stored temporarily in that cache slot. In this storage system, the data that has been read out or the data that is to be written are always exchanged between the command control section 102, 105 and the disk control section 107, by passing via the cache memory 108.

A disk control section 107 is provided for each storage device 60, and controls the storage device 60 to which it corresponds. For example, the disk control section 107 performs reading or writing of data, from or to the data storage region of one or more storage device 60 (for example, the target logical volume), on the basis of the control table held in the shared memory 106. Moreover, the disk control section 107 may also, for example, convert an I/O request for a logical volume into a I/O request for a physical disk, by converting the logical address into a physical address.

The foregoing was a general description of a storage system according to the present embodiment. Although not illustrated in the drawings, the storage control device 10 is provided with a switching control section whereby, for example, the command control section 102, 105, the disk control section 107, the shared memory 106 and the cache memory 108 are mutually connected in a communicable fashion. The switching control section may be constituted by a high-speed bus, such as an ultra-high-speed crossbar switch, or the like, which performs data transfer by means of a high-speed switching operation. The exchange of data and commands between the command control section 102, 105, the disk control section 107, the shared memory 106 and the cache memory 108 is carried out via the switching control section, which is not illustrated.

Below, an overview of a sequence for processing an I/O request in the aforementioned storage system is described, taking as an example a case where the host 20 has issued an I/O request. This description is divided into explanation of a case where the issued I/O request indicates a read request and explanation of a case where the issued I/O request indicates a write request.

(1) If the I/O Request Indicates a Read Request.

The I/O request issued by the host 20 is received by the channel control section 101 via the connection port 100, and the channel control section 101 stores this I/O request in the I/O request buffer 109. The command control section 102 reads out the I/O request thus stored, and judges whether or not the data requested for reading in the I/O request (hereinafter, the "read request data") is present in the cache memory 108, on the basis of the I/O request and the control table identified from same.

If the result of this judgment is affirmative, in other words, if the read request data is present in the cache memory 108 (a "cache hit"), then the command control section 102 obtains the read request data from the cache memory 108 and transmits this read request data to the host 20, via the channel control section 101.

On the other hand, if the result of the aforementioned judgment is negative, in other words, if the read request data is not present in the cache memory 108 (a "cache miss"), then the command control section 102 instructs the disk control section 107 to read out the read request data in the storage device 60 temporarily to the cache memory 108. Thereby, the read request data is read from the storage device 60 by the disk control section 107, and stored in the cache memory 108, and the command control section 102 then obtains this read request data from the cache memory 108 and transmits it to the host 20. In this processing, the connection between the host 20 and the storage control device 10 is isolated during the processing for reading the read request data in the storage device 60 to the cache memory 108. In this way, when a cache miss has occurred, a performance deterioration occurs in comparison to a case where there is a cache hit, only to the extent of the time taken for the processing of reading out the read request data to the cache memory 108, and the time taken to reconnect the storage control device 10 to the isolated host 20.

(2) If the I/O Request Indicates a Write Request.

The I/O request containing data to be written (hereinafter, called "write request data") is received by the channel control section 101 from the host 20, via the connection port 100, and the channel control section 101 stores this I/O request in the I/O request buffer 109. The command control section 102 reads out the I/O request thus stored and judges whether or not data is present in the prescribed cache slot of the cache memory 108, on the basis of that I/O request and the control table identified from same.

If the judgment result is affirmative, in other words, if data is present in the prescribed cache slot (a "cache hit"), then the command control section 102 writes the write request data contained in the I/O request it has read out, over the data in the prescribed cache slot.

On the other hand, if the result of the aforementioned judgment is negative, in other words, if data is not present in the prescribed cache slot (a "cache miss"), then the command control section 102 instructs the disk control section 107 to read out data from the data storage region identified by the read I/O request, temporarily, to the cache memory 108. Thereby, once data has been read from that data storage region by the disk control section 107 and stored in the prescribed cache slot, the command control section 102 writes the write request data contained in the read I/O request, over the data stored in the prescribed cache slot.

In this way, when the write request data has been written to the cache memory 108, the write request is taken to be completed, and a completion report is returned by the storage control device 10 to the host 20. At the time that the write request data is written to the cache memory 108, in general, this data is not reflected in the drives 600, 600, ... of the storage device 60, and supposing that the data in the cache memory 108 is corrupted due to a fault in the storage control device 10, or the like, then a data loss will occur, but in order to avoid data loss of this kind, in the storage control device 10 according to the present embodiment, it is possible to double up the data in the cache memory 108 that has not yet been copied to the drives, and it is also possible to use a non-volatile memory for the cache memory 108.

The foregoing gave an overview of the sequence for processing an I/O request in the storage system according to the present embodiment.

Below, the principal parts of the storage system according to the present embodiment shall be described in more detail. Firstly, a description shall be given to aid understanding of these principal parts.

The hosts 20, 30, 40 are connected to the storage control device 10 by means of an I/O interface equipped with a prescribed communications protocol, for example, a communications protocol which allows communications to be carried out whilst mixing the input/output communications frame for one I/O request with the input/output communications frame for another I/O request. This communications protocol may also be, for example, a communications protocol (such as the ESCON (Enterprise Systems Connection) protocol) whereby sequential communications are performed in such a manner that an interlock for the transmission of data or a command and a response to same is created, whereupon the next data or command is transmitted, or it may be a communications protocol (such as the FICON (FIbre CONnection) protocol, or the FC-SB2 protocol (FIBRE CHANNEL Single-Byte Command Code Sete-2 Mapping Protocol)) whereby the host is able to transmits data or commands in a pipeline fashion, without creating an interlock. When processing of an I/O request issued by a host 20, 30, 40 is carried out, under a communications protocol of this kind, the command or data contained in the I/O request, and the response to that command or data, are exchanged between the host 20, 30, 40 and the storage control device 10 in the form of frames.

An I/O request requests the reading of data from the storage device 60, or the writing of data to the storage device 60, and under the various types of communications protocols described above (for example, the FC-SB2 protocol), the I/O request is a command set known as a "CCW" (Channel Command Word).

At least one or more type of command element are contained in the CCW chain, and more specifically, for example, a Define Extent (hereinafter, abbreviated to "DX"), a Locate Record (hereinafter, abbreviated to "LOC"), a read command, write command, and the like. The DX command is a command specifying access permission information, access mode, and the like, for the data subject to the I/O request (known as the "record"), and this command is transmitted initially when the I/O request is issued. The LOC command indicates information such as the cylinder number, track number, record number, and the like, which state the position of the record subject to I/O request on the storage device 60 (for example, the address of the data storage region).

Figure 2:
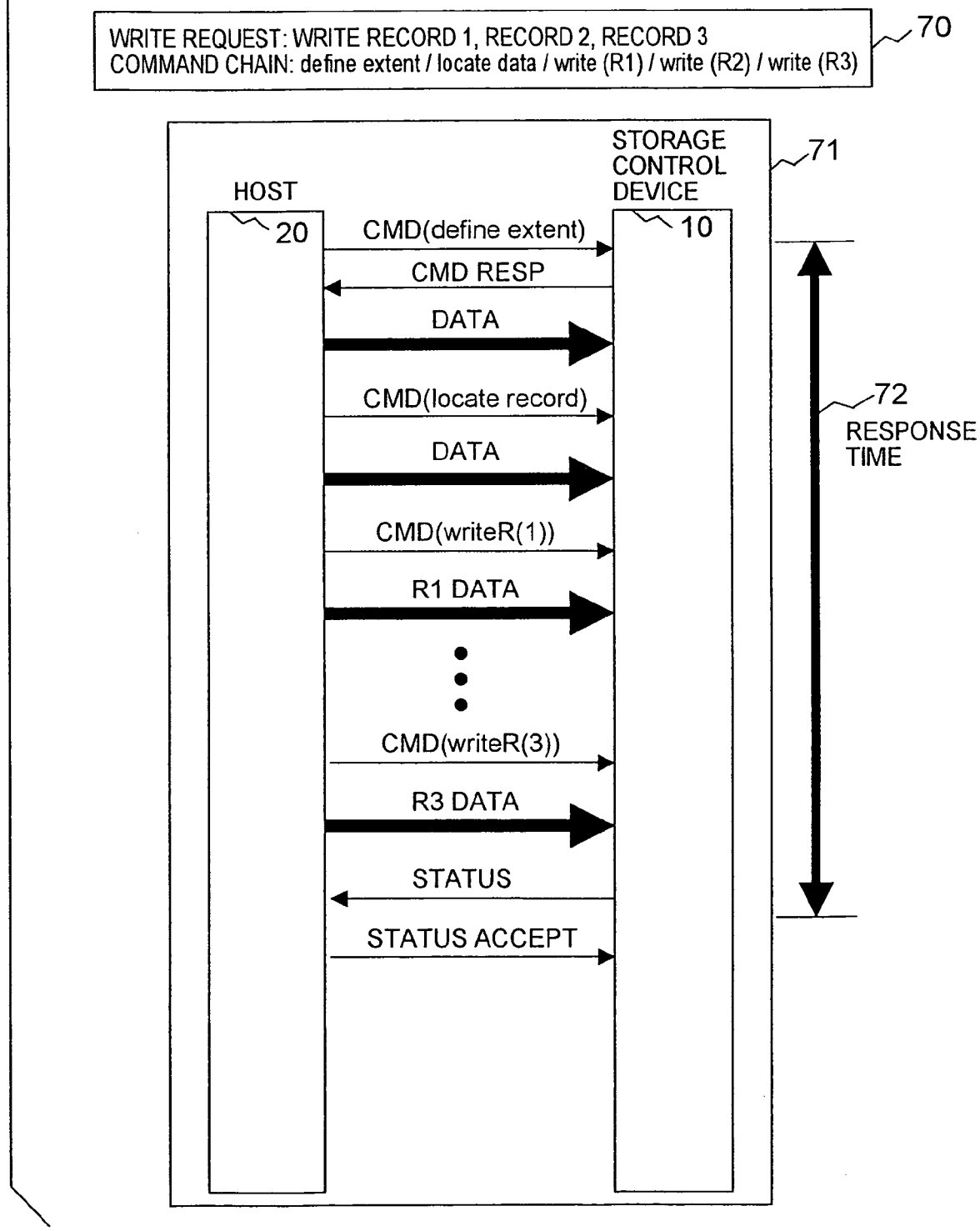
FIG. 2 shows one example of a processing flow relating to a write I/O request.

A concrete example of the sequence of processing for this CCW chain (I/O request) is now described with reference to FIG. 2.

In this example, data is read out or written in units known as "records", and a plurality of records are gathered together to form units known as "tracks". In this example, it is supposed that the host 20 has issued an I/O request 70 containing a write command for writing record 1, record 2 and record 3 of a certain track. Therefore, the I/O request 70 is issued as a command chain of consecutive commands, this command chain 70 being "define extent/locate data/write (R1)/write(R2)/write(R3)". In this command chain 70, the command up to "define extent/locate data" is a command for positioning the data in the drives in the storage device 60, and the "write(Rn:N=1,2,3)" command is a write command for the write request data.

Firstly, the frame of the initial command (define extent) of the one or more commands or data contained in the command chain is issued by the host 20 to the storage control device 10. Thereupon, when this command has been received by the storage control device 10, the storage control device 10 returns a command response frame, as a response to that command. According to the FC-SB2 protocol, and the like, the host 20 is able to transmit parameter data for the command in question, in the form of data frames, without having to wait for this command response frame, but in the present example, the sequence is described as command response, followed by data. Upon receiving the parameter data from the host 20, the storage control device 10 executes processing relating to the define extent command described above.

Thereupon, the next command "locate record" and data frame are issued by the host 20, and the storage control device 10 executes processing relating to this command and data. By means of these two command "define extent" and "locate record", the storage position information for the write request data is identified, and the storage control device 10 judges whether or not this corresponds to a "cache hit" or a "cache miss". Below, a case where this is a "cache hit" is described as an example.

A write record command is transmitted by the host 20. Thereupon, data for record 1, which is write request data, is transmitted by the host 20 in the form of a data frame. The storage control device 10 writes this updated data to the cache memory 108. Similarly, the storage control device 10 also receives a write record command and write request data for record 2 and record 3, and it writes this data to the cache memory 108.

When the updated data for record 3 has been written to the cache memory 108 (or to a prescribed data storage region of the storage device 60), the storage control device 10 then transmits a status frame indicating that the processing relating to the I/O request 70 has been completed, to the host 20 which issued the original command. Upon receiving this status frame, the host 20 transmits a status acceptance frame indicating a response to the reception of the status frame.

The foregoing described the sequence of processing for the I/O request 70. The processing relating to the I/O request 70 terminates when the storage control device 10 receives the aforementioned status acceptance frame. Moreover, the I/O response time 72 relating to the I/O request 70 is the length of time from the time point at which the host 20 issued the I/O request 70, until the time point at which reception of the status frame was confirmed. Furthermore, FIG. 2 shows the flow of data communications in a case where the I/O request is one requesting writing of data, and if the I/O request were one requesting reading of data, the direction of communication of the read request data would be the opposite of the direction of communication of the write request data. Furthermore, FIG. 2 is a flowchart in the case of a "cache hit", but in the case of a "cache miss", a generally similar processing flow is followed, with the exception that the storage control device 10 requests temporary isolation of the connection to the host 20, and the storage control device 10 then requests reconnection to the host 20 at the time that the reading of data from the storage device 60 to the cache memory 108 has been completed.

Next, the response time in a case where there are a plurality of I/O requests shall be considered.

Figure 3:
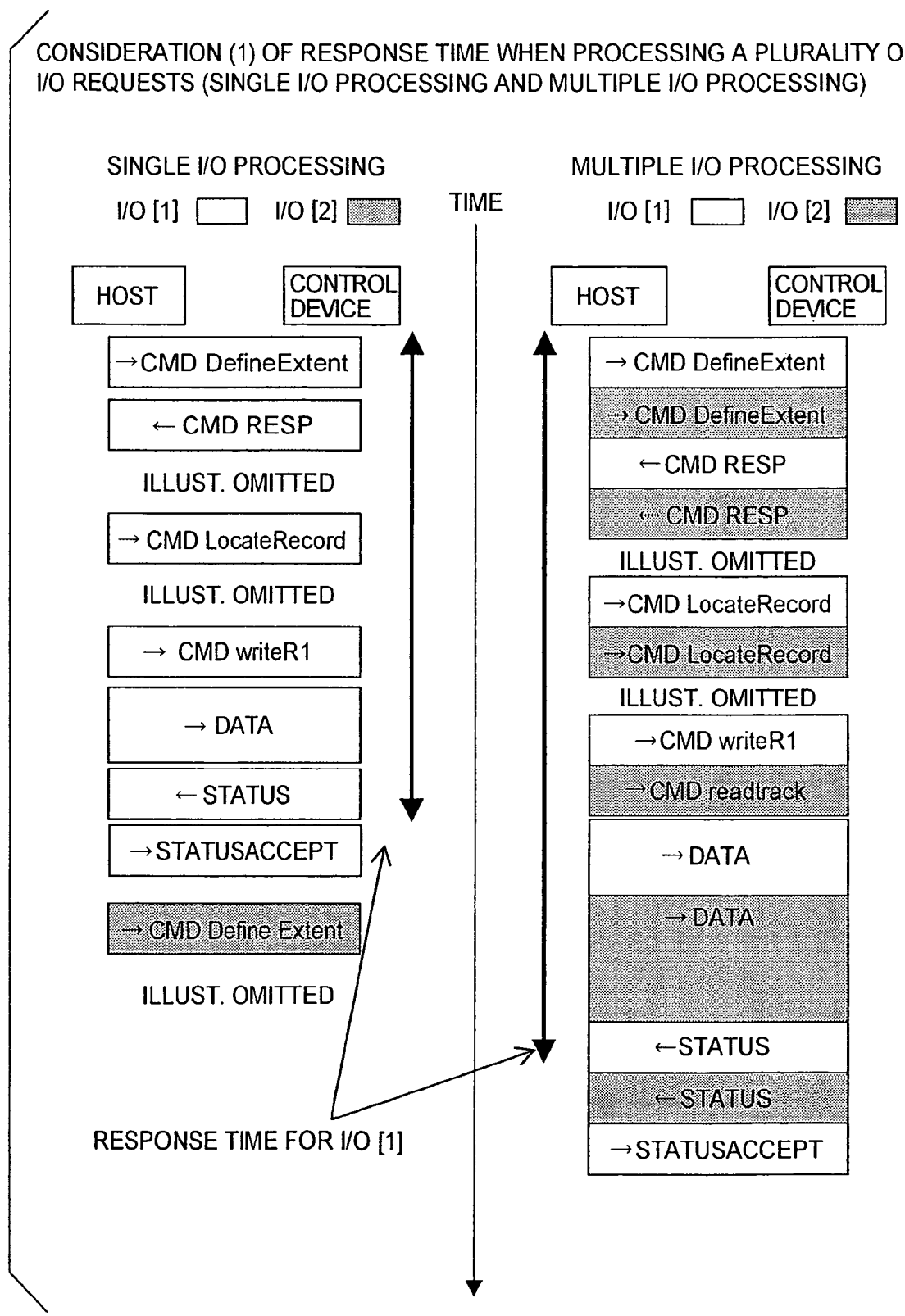
FIG. 3 shows a first consideration of response time in the processing of a plurality of I/O requests.

If the storage control device 10 accepts an I/O request from the host 20 and if a plurality of I/O operations are processed in parallel when carrying out processing corresponding to that request, then it is possible to increase the operating rate of the connection ports and the operating rate of the processor, according to the schedule by which these respective processes are carried out, as a result of which, the number of I/O operations that can be processed per unit time is improved in comparison with a case where a plurality of I/O requests are processed one at a time, without any mixing thereof. However, if, on the other hand, attention is focused on the response time of each of the plurality of I/O requests that are processed in a parallel fashion, then the response time may become shorter if the individual I/O requests are processed one at a time, without carrying out parallel processing of the respective I/O operations. FIG. 3 shows one example of such a case.

FIG. 3 shows models based on a case where processing of two I/O requests [1], [2] is carried out separately, in a sequential fashion, in the order [1] [2], and a case where the frames of the I/O requests are processed in a combined fashion. According to FIG. 3, in a case where the frames of the two I/O requests are mixed together, compared to a case where they are executed sequentially, the free time of the processor (for example, the processor containing the command control section. 102 or 105) is lower, and hence the operating rate of that processor and the connection ports 100, 103 is higher. However, focusing on the response time of I/O request [1], this response time will be shorter is the processing for each respective I/O request is carried out in a sequential fashion, in the order [1] [2].

In this way, it can be expected that there will be a possibility of increasing the number of I/O requests that can be processed, by combining the frame of a different I/O request [2] during the processing of a first I/O request [1], in a continuous fashion, and furthermore, by transmitting and receiving frames in both directions. However, although a plurality of I/O requests are being processed, when viewed in terms of the command units or data units contained in the respective I/O requests, the situation is not substantially different from a case where only one I/O request is being processed. Since respective frames relating to a plurality of I/O requests can be transmitted and received in a combined fashion, it is possible to reduce the free time at the connection ports 100, 103. Thereby, it can be expected that the overall number of I/O requests that can be processed per unit time will be increased, in comparison with a protocol which only processes one I/O request at a time. Nevertheless, focusing on a single I/O request consisting of the same command, the results illustrated in FIG. 3 described above can be obtained, if the response time is considered in a case where processing is carried out using both a single I/O processing protocol and a multiple I/O processing protocol. In other words, in the case of a single I/O request consisting of the same command, the response time in a case where processing is carried out using a single I/O processing protocol is shorter than the response time in a case where processing is carried out using a multiple I/O processing protocol. Of course, in either case, the results are not necessarily the same as those shown in FIG. 3, but in general, the higher the degree of multiple operation that is established, the poorer the I/O response time when viewed in terms of a single I/O request. However, in the case of multiple I/O processing, the operating rate of the ports and the processor is improved compared to single I/O processing, and therefore the number of I/O requests that can be processed per unit time is increased, and the through-put characteristics of the system are also superior in this case. In other words, two possible measures of the performance of an information processing system can be identified, in terms of shortening of the I/O response time and increasing of through-put, but which of these is to be emphasized depends on the composition and use configuration, and the like, of the system, a particularly important factor being whether the system uses batch processing or on-line processing. For example, in the former case, the through-put is emphasized, and in the latter case, the I/O response time is emphasized. In the present embodiment, attention with respect to the I/O response time is focused on the average response time for a plurality of I/O requests.

As described previously, the I/O response time is the length of time from the issuing of the I/O request by the host until the reception of a completion notification, and in more detail, as illustrated in FIG. 4, it is the total of (1) the time from the issuing of the I/O request by the host until the arrival of same at the storage control device, (2) the time until the processing of the I/O request reaches a standby state in the storage control device, (3) the time taken for the I/O request to be processed in the storage control device, and (4) the time from the issuing of the completion notification by the storage control device until reception of same by the host.

Next, the average response time for a plurality of I/O requests is considered, and an example thereof is illustrated in FIG. 4. In this example, it is supposed that I/O requests [3] [4] [5] are issued in approximately simultaneous fashion by the host 20. It is also supposed that the three I/O requests consist respectively of three commands, a, b, and c. In other words, the I/O request [3] contains commands [3]-*a*, [3]-*b*, [3]-*c*, and the same applies substantially to the I/O requests [4] and [5]. Furthermore, in the case illustrated in FIG. 4, it is supposed that the time taken to process each of the commands a, b, c is the same. It is supposed that the time taken to execute each command is Tc. Therefore, since all of the I/O requests consist of three commands a, b, c, the processing time required to process each of the I/O requests will be 3Tc. Moreover, in order to make the description easier to understand, the overhead from the termination of processing of the command of one I/O request until the start of processing of the command in another I/O request (in other words, the overhead when switching the I/O request that is to be processed) is omitted.

As shown in FIG. 4, in case "3-A", processing is carried out in the sequence I/O request [3], I/O request [4], I/O request [5]. In this case, the I/O response times of the three I/O requests [3], [4], [5] are respectively 3Tc, 6Tc and 9Tc. Therefore, the average response time for the three I/O requests [3], [4], [5] will be 6Tc.

On the other hand, in this diagram, in the case "3-B", processing is carried out in the following sequence: the command [3]-*a* of I/O request [3], the command [4]-*a* of I/O request [4], the command [5]-*a* of I/O request [5], the command [3]-*b* of I/O request [3], the command [4]-*b* of I/O request [4], the command [5]-*b* of I/O request [5], the command [3]-*c* of I/O request [3], the command [4]-*c* of I/O request [4], and the command [5]-*c* of I/O request [5]. The point focused on here is the I/O response time for each I/O request. Although the timing at which the processing for the three I/O requests terminates is the same as in the case "3-A", the respective I/O response times are 7Tc for I/O request [3], 8Tc for I/O request [4] and 9Tc for I/O request [5], and therefore the average response time for these three I/O requests will be 8Tc.

In the foregoing description, in order to make the consideration of the average response time simpler to understand, the overheads associated with switching the I/O request that is being processed are omitted from the explanation, but if these overheads were incorporated, the difference in average response time between case "3-A" and case "3-B" would be even more pronounced. The example in FIG. 4 is a model of a case where the average response time becomes longer due to the mixing of command processing for a plurality of I/O requests.

Next, the difference in average response time depending on the execution sequence when processing a plurality of I/O requests, will be described with reference to FIG. 5. In FIG. 5, I/O requests [6] and [7] are described as examples. In this example, it is supposed that the I/O request [6] takes twice the processing time as the I/O request [7], and therefore the respective processing times for the processing of I/O requests [6], [7] are 2T and T. Moreover, in this example, similarly to the example described with reference to FIG. 4, it is supposed that the I/O requests are issued in an approximately simultaneous fashion by the host 20, and moreover, in order to simplify the explanation, the overheads associated with switching, and the like, between the I/O requests being processed are also omitted.

In case "4-A", processing is carried out in the sequence: I/O request [6], I/O request [7]. Therefore, the average response time of the two I/O requests is 2.5T.

On the other hand, in case "4-B", processing is carried out in the sequence: I/O request [7], I/O request [6]. Therefore, the average response time for the two I/O requests will be 2T, and hence the average response time is improved compared to a case where the I/O requests are processed in the sequence indicated in case "4-A".

The foregoing descriptions concerned various examples of response time for I/O requests. In the first example, in other words, in the example described with reference to FIG. 3, it is sought to increase the operating rate of the processor (for example, the processor containing the command control section 102 or 105) and to improve through-put, by combining the processing of command and frames for a plurality of I/O requests, but in some cases, the response time for any one particular I/O request may become slower. In the second example, in other words, in the example described with reference to FIG. 4, there are situations where, focusing on the average response time for a plurality of I/O requests, the average response time differs between cases where the I/O requests are executed, one by one, in a sequential fashion and cases where processing of command and frames for a plurality of I/O requests is carried out in a mixed fashion. In the third example, in other words, in the example described with reference to FIG. 5, similarly to the second example, the focus is on the average response time of the plurality of I/O requests, but here the average response time varies in accordance with the sequence in which a plurality of I/O requests are executed, without mixing the commands and frames of the plurality of I/O requests together.

As can be seen from the foregoing examples, the average response time for two or more I/O requests may differ, in some cases, depending on the sequence in which the plurality of commands or data contained in the two or more I/O requests are processed, and it may also differ, in some cases, depending on the sequence in which the two or more I/O requests themselves are processed.

The foregoing was a description for aiding-understanding of the principal parts of the present embodiment. Below, the principal parts of the present embodiment shall be described. In this description, the communications protocol used to communicated with the host 20, 30 and 40 is a communications protocol that allows communications to be performed by mixing the input/output communications frames for one I/O request with the input/output communications frames for another I/O request, for example, an FC-SB2 protocol. Therefore, in contrast to the ESCON protocol, rather than the logical connection path between the host and the storage control device 10 (hereinafter, called the "logical path") being occupied during execution of the processing of a single I/O request, the storage control device 10 is able to execute processing of I/O requests relating to a plurality of data storage regions (for example, logical volumes), simultaneously, on the same logical path. Moreover, after transmitting a write or read command contained in an I/O request to the storage control device 10, the host 20 is able to transmit write request data without waiting for a command response from the storage control device 10, and without needing to wait for such a response, and moreover, the host is able to transfer to the processing of the next command, and to issue a further I/O request, even if it has not received a status frame for the previous command.

FIG. 6 shows a performance information table 1060 prepared in the shared memory 106 of the storage control device 10.

In the performance information table 1060, expected values relating to the length of time that it is expected to take to process a command or data having certain attributes is registered for each of a plurality of command and data attributes relating to commands or data contained in I/O requests (the excepted values may indicate the actual length of time, or they may indicate another meaning related to that length of time). The information registered in the performance information table 1060 may be information that is input by a human user by means of the service processor 50, or it may be registered automatically by the storage control device 10 on the basis of statistical information described hereinafter.

The performance information table 1060 contains a command processing time sub-table 1060A and a data transfer processing time sub-table 1060B.

The expected value of the length of time required for the processing of a command having certain attributes is registered for each of a plurality of command attributes (for example, a command type) relating to commands contained in I/O requests, in the command processing time sub-table 1060A. This expected value is, for example, related to the length of time from the time at which the processing of the command was initiated, until the time at which this processing is completed and a prescribed signal is transmitted to the host.

The expected value of the length of time required for the processing of a command having a certain attribute is registered for each of a plurality of data attributes (for example, a transfer type and transfer length)-relating to data contained in I/O requests, in the data processing time sub-table 1060B. The expected time for data of the transfer type "read processing", for example, relates to the length of time until the data is read out from the cache memory 108 and transmitted to the host. Furthermore, the expected value for data of the transfer type "write processing" relates, for example, to the length of time until data is read out from the I/O request buffer 110, set in the cache memory 108, and this data is then stored from the cache memory 108 to the storage device 60.

According to the performance information table 1060 illustrated in FIG. 6, for example, if a certain I/O request is a read request, and if this request is constituted by a command of command type [1] a command of command type [2] and data of data length a, then the total of the expected value for that I/O request (in other words, the length of time that it is forecast that the I/O request will take to process) will be T1+T2+Ta.

The foregoing was a description of a performance information table 1060. Needless to say, the type of information registered in the performance information table 1060 is not limited to that illustrated in FIG. 6. For example, it is also possible to record a variety of expected values in the performance information table 1060, according to whether there is a cache hit or a cache miss. Moreover, the expected values registered in the command processing time sub-table 1060A, or the expected values in the data transfer processing time sub-table 1060B when the transfer type is "read processing" may also contain the length of time it takes for the data sent by the storage control device 10 to arrive at the host 20, 30, or 40. This length of time may be a common value for all of the hosts 20, 30, 40, or it may be a separate value for each of the hosts 20, 30, 40.

Next, although not indicated specifically in the drawings, the statistical information table 1061 shall be described.

Statistical information based on the history relating to I/O request processing carried out in the past by the storage control device 10 is stored in the statistical information table 1061. This statistical information is, for example, information containing statistics on the length of time it takes to carry out processing (for example, the average time), for each of a plurality of attributes relating to commands or data.

Statistical information is stored in this statistical information table 1061 according to the sequence described below, for example.

For instance, when the respective constituent elements of the storage control device 10 (for example, the command control section 102 and 105) have processed a command or data in an I/O request, a history relating to that command of data is registered, thereupon or at a prescribed timing (for example, at periodic intervals), in a prescribed history storage region (for example, a non-volatile memory). The registered history is a history relating to a prescribed period of the past, for example.

The prescribed constituent elements of the storage control device 10 (for example, the respective micro-processors containing the channel control section and the command control section) trace the I/O request processing for a prescribed period in the past, for example, on the basis of the history information written to the aforementioned history storage region, at a prescribed timing (for example, at periodic intervals), and based on the results of this tracing operation, they store a statistic value for the length of time taken to process a particular command or data, in the statistic information table 1061, for each command or data attribute in the I/O requests.

The prescribed constituent elements of the storage control device 10 (for example, the respective micro-processors containing the channel control section and the command control section) may also update the contents of the performance information table 1060 at appropriate times (for example, at periodic intervals), on the basis of the aforementioned length of time stored in the statistical information table 1061. More specifically, for example, the prescribed constituent elements may read out the length of time corresponding to the respective entries (command or data attributes), from the statistical information table 1061, and then update the contents of the performance information table 1060 by writing the length of time thus read out over the expected value corresponding to that entry in the performance information table 1060.

Next, the I/O request buffers 109 and 110 are described with respect to FIG. 7. 109 and 110 are substantially the same in functional terms, and therefore the I/O request buffer 109 is described as a representative example.

The I/O request buffer 109 is a buffer for the processor carrying out processing of I/O requests (more specifically, the processor containing the channel control section 101 and the command control section 102), and it can be accessed by the channel control section 101 and the command control section 102 contained in the same processor. A buffer region is provided for each of N I/O requests in this I/O request buffer 109, in such a manner that the command or data frames for each I/O request can be stored in the buffer region corresponding to that I/O request. Moreover, it is also possible to register I/O request number information in the I/O request buffer 109, in order to indicate the number of I/O requests currently registered in the buffer 109. Furthermore, it is also possible to register execution sequence information (for example, information indicating the sequence of processing), for each I/O request, in this I/O request buffer 109.

The configuration of the I/O request buffer 109 is not limited to one where buffer regions are provided for each I/O request, as in the example shown in FIG. 7. For instance, the I/O request buffer 109 may also have a configuration wherein the command or data frames received by the channel control section 101 are stored in the order in which they arrive (for example, a FIFO system), regardless of which I/O request they are contained in.

Initially, or after receiving a response corresponding to a prescribed command (for example, a "locate record" command), the host 20 is able to transmit commands or data contained in each of the I/O requests to the storage control device 10 at any timing and in any number for each I/O request issued, under a specific communications protocol. Consequently, there may be cases where there is only one unprocessed data item or command for each I/O request in the I/O request buffer 109, and there may be cases where there are two or more unprocessed data items or commands.

The channel control section 101 manages the empty space and regions, and the like, of the buffer 109, and when the very first I/O request is received from the host 20, it stores the command or data contained in that I/O request in a buffer region which does not yet contain a command or data, or alternatively, if a new command or data frame has been received for an already received I/O request, then it adds that command or data to the buffer region corresponding to that I/O request. Moreover, the channel control section 101 identifies the number of I/O requests registered in the I/O request buffer 109 and registers I/O request number information expressing that number in the buffer 109. Furthermore, the channel control section 101 updates the I/O request number information registered in the buffer 109, each time the number of I/O requests registered therein changes. Moreover, the channel control section 101 may also manage the data that is to be preserved in the buffer 109 and the data that is to be erased from same. More specifically, for example, the channel control section 101 may operate in such a manner that if there are already processed commands or data relating to an I/O request for which processing has not yet been completed to the very end (for example, an I/O request for which a status frame indicating the end of processing has not been transmitted, or for which the corresponding response has not been received), then these commands or data are not yet erased, and the commands and data contained in that I/O request are all erased jointly at the stage that all of the processing has been completed. In this way, since the data and commands contained in an I/O request remain in the buffer 109 until the processing for the I/O request has been completed, then it is possible to determine the request processing sequence in I/O request units, as described hereinafter.

The command control section 102 determines the sequence in which two or more I/O requests received by the host 20 are to be processed (or alternatively, the sequence in which the plurality of data or commands contained in two or more I/O requests are to be processed), by means of a method described hereinafter. The command control section 102 carries out processing of the I/O requests (or the command or data contained in same) present in the buffer 109, according to the request processing sequence thus determined, by registering execution sequence information for each I/O request (for example, a processing sequence) in the I/O request buffer 109 (in other words, in the internal memory of the microprocessor containing the command control section 102), on the basis of the sequence thus determined (hereinafter, called the "request processing sequence").

Various method can be conceived for determining the request processing sequence. Below, an example of a method for determining a request processing sequence is described with reference to FIG. 8 onwards.

Figure 8:
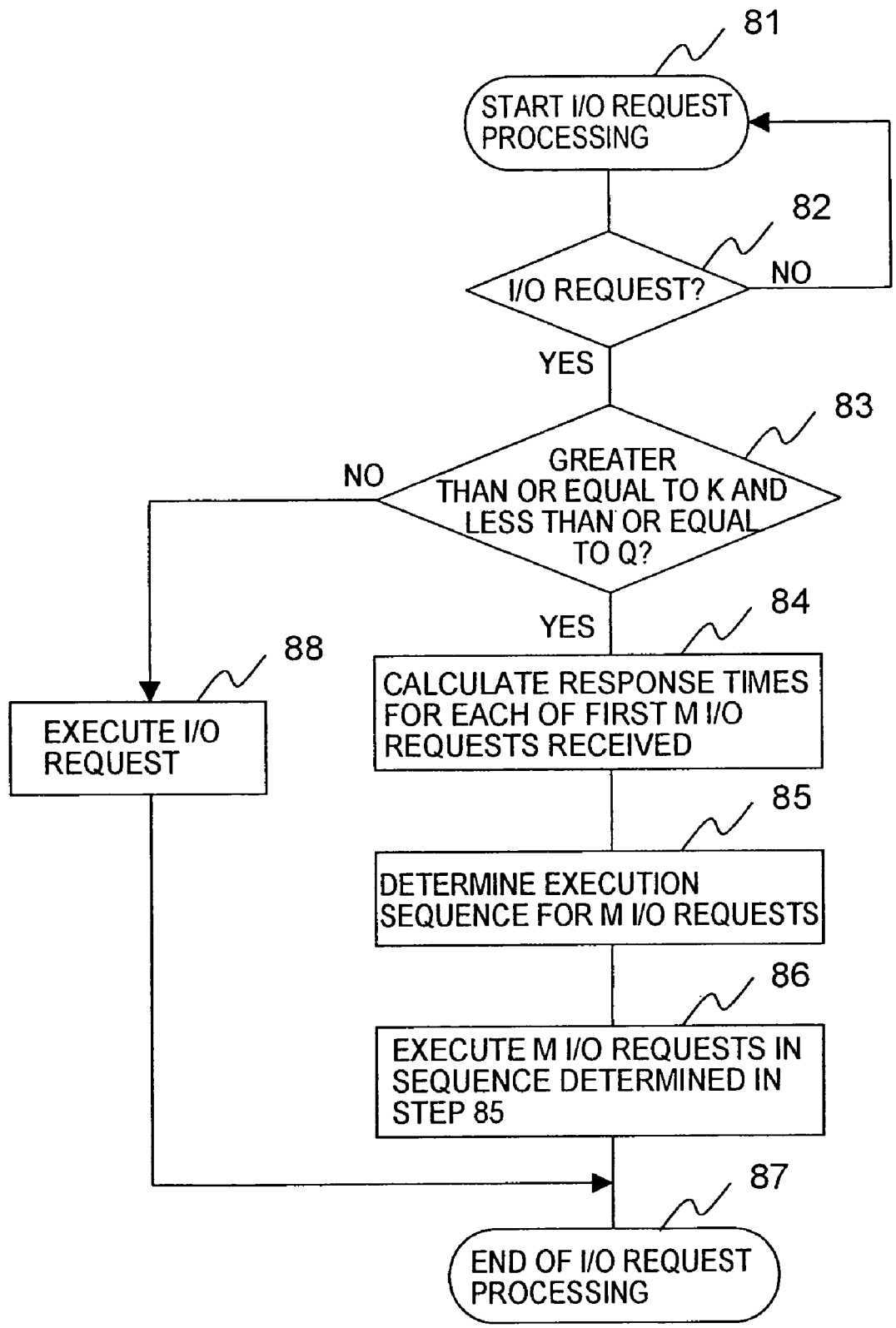
FIG. 8 shows an overview of a processing flow implemented by a command control section 102 when determining a sequence for processing I/O requests, according to a first request processing sequence determining method.

FIG. 8 shows an overview of a processing flow implemented by the command control section 102 when determining a sequence for processing I/O requests, according to a first request processing sequence determining method.

When I/O request processing has started (step S81), the command control section 102 refers to the I/O request buffer 109 and if there is an I/O request in the buffer 109 (Y at S82), then it checks the number of I/O requests that are to be executed (of that can be processed) (S83). The "I/O requests that are to be executed (or can be processed)" means, for example, the I/O requests for which all of the data or commands they contain are registered in the buffer 109, and which have at least one data or command of all of the data or commands thereof still in an unprocessed state.

If, as a result of S83, the number of I/O requests present that are to be executed is less than K (where K≧2) (N at S83), then the command control section 102 executes the I/O requests in the buffer 109 (S88).

On the other hand, if, as a result of S83, the number of I/O requests present that are to be executed is equal to or greater than K and equal to or less than Q (Y at S83), then the command control section 102 calculates the total of the expected values for the I/O response times, in other words, it forecasts the I/O response times for each of the I/O requests, for each of the first M I/O requests (where $K \leq M \leq Q$) to arrive in the buffer 109, on the basis of the attributes of the commands and data contained in those I/O requests, and on the basis of the performance information table 1060 (and/or the statistical information table 1061) (S84). The command control section 102 then identifies a suitable average response time for the M I/O requests, on the basis of the total of the expected values calculated for each I/O request, and it determines an request processing sequence for the I/O requests whereby the average response time thus identified can be obtained (S85). The command control section 102 registers a processing sequence for each of the M I/O requests, in the I/O request buffer 109, on the basis of the request processing sequence thus determined. The command control section 102 starts processing in order to execute the M I/O requests, in the registered processing sequence (S86), and when processing for the M I/O requests has been completed, it terminates (S87).

In the processing flow illustrated in FIG. 8, for example, it is possible to start step S81 at the time that the number of I/O requests that are to be executed reaches the number Q. Moreover, the values K and Q described above are parameters which are previously determined in a non-changeable or a changeable fashion. If the values of K and Q become larger, then the number of I/O requests subject to scheduling of the processing sequence increases, and therefore it becomes possible to reduce the average response time for the M I/O requests yet further, but conversely, the overhead required for determining the I/O execution sequence becomes larger.

Figure 9:
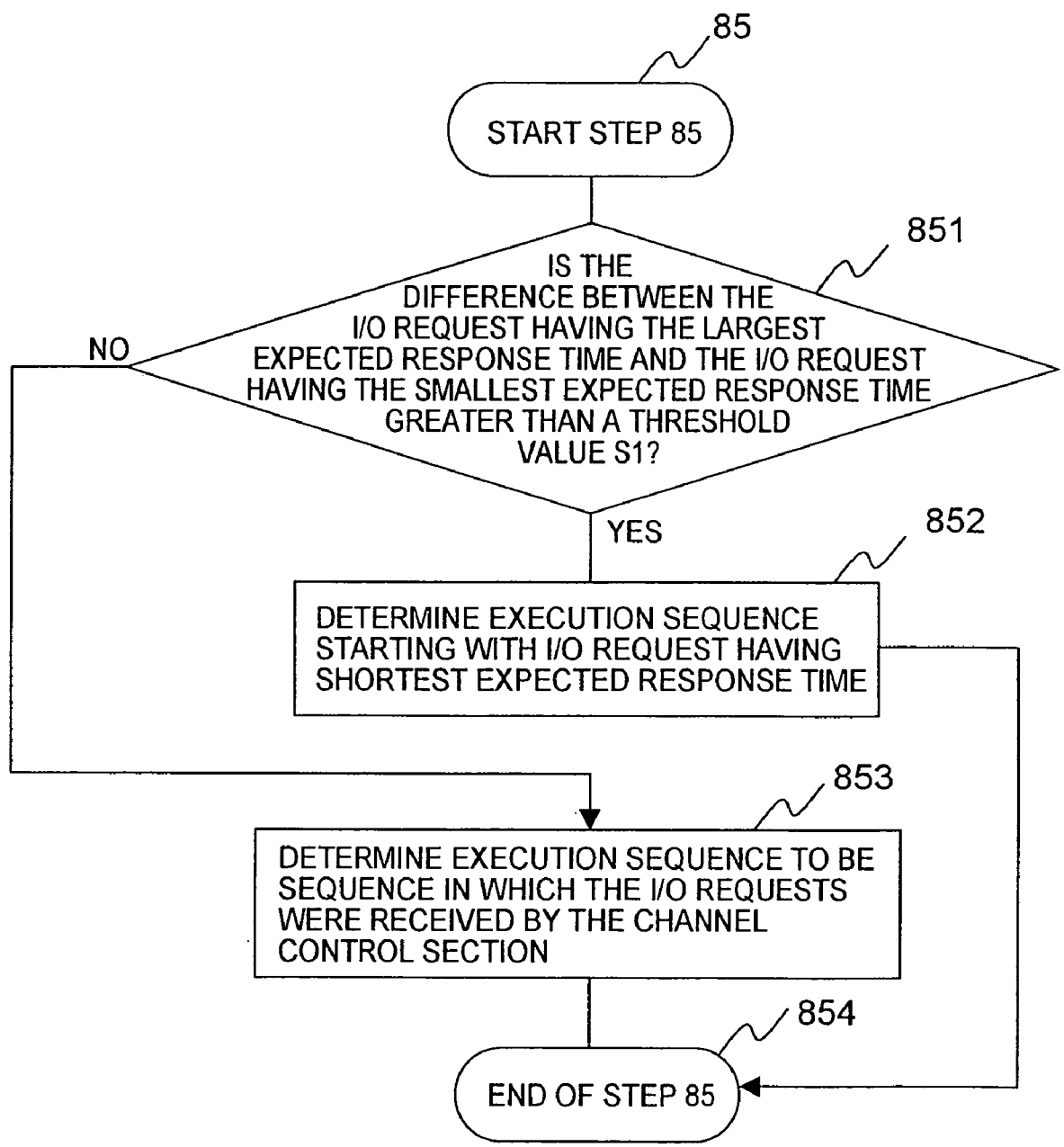
FIG. 9 shows one example of the step of determining a request sequence at S85 illustrated in the processing flow in FIG. 8.

FIG. 9 shows one example of the step of determining a request sequence at S85 illustrated in the processing flow in FIG. 8.

The command control section 102 compares the largest and the smallest of the M totals for the expected values calculated for the M I/O requests (S851).

If, as a result of the comparison in S851, the difference between the largest and the smallest total exceeds a prescribed threshold value S1 (Y at S851), then the command control section 102 determines the request processing sequence for the M I/O requests to be a sequence starting from the request having the smallest total of expected values for the I/O response times, and it writes the sequence thus determined to the I/O request buffer 109 (S852).

On the other hand, if, as a result of the comparison in S851, the difference between the largest and the smallest total is equal to or less than the prescribed threshold value S1 (N at S851), then the command control section 102 determines the request processing sequence for the M I/O requests to be the same as the sequence in which the requests were received (for example, the reception sequence of the "Define Extent" commands), and it writes the sequence thus determined to the I/O request buffer 109 (S853).

When the processing in S852 or S853 has been completed, step S85 terminates (S854).

In the foregoing description, the prescribed threshold value S1 is, for example, a parameter established previously in a changeable or non-changeable fashion. Moreover, if the request processing sequence is controlled only according to the simple magnitude relationship between the first expected value total and the second expected value total, of the aforementioned M expected value totals, without setting a threshold value S1, then although it is possible to achieve fine control of the request processing sequence for the M I/O requests, if consideration is given to the overhead generated by switching the request processing sequence of the I/O requests to a different sequence than the sequence in which they were received (for example, the sequence in which the "Define Extent" commands were received), then this overhead can be eliminated by setting a suitable threshold value S1, for example, and executing a plurality of I/O requests in the order in which they were received, if the total of the estimated values of the I/O response times for those I/O requests come within a certain range. Stated alternatively, for example, in the case of two or more I/O requests for which the total of the estimated values of the I/O response times comes within the prescribed range, processing is carried out in the same sequence as the sequence in which the I/O requests were received, whereas in the case of another two or more I/O requests for which the total of the estimated values of the I/O response times lies outside the prescribed range, then the request processing sequence for the other two or more I/O requests can be set to be a sequence starting from the request having the smallest total of estimated values for the I/O response times.

The foregoing is a processing flow for the command control section 102 based on a first method for determining the request processing sequence. Next, the processing flow of the command control section 102 based on a second method for determining the request processing sequence shall be described with respect to FIG. 10 onwards.

Figure 10:
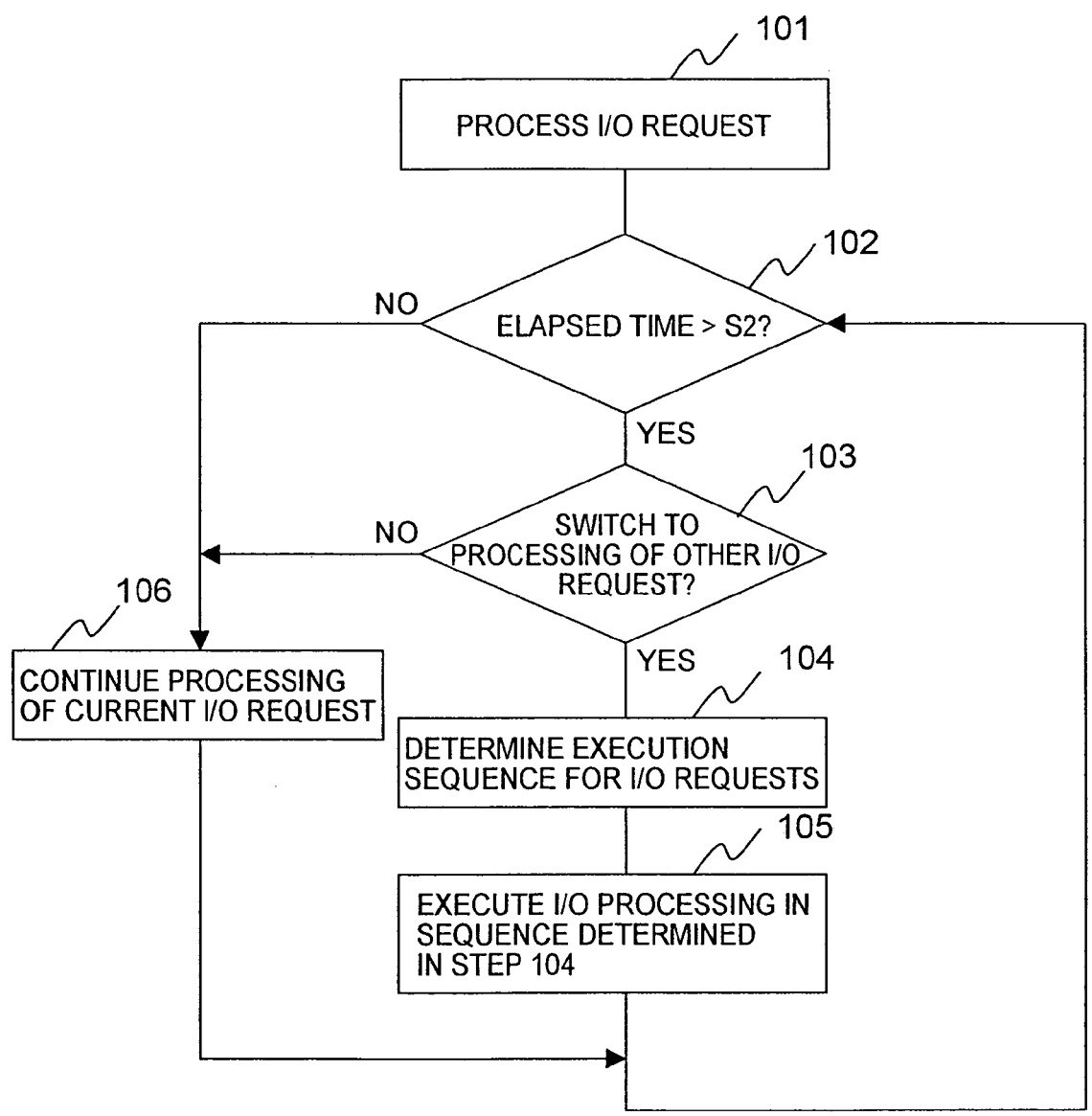
FIG. 10 shows an overview of a processing flow implemented by a command control section 102 when determining a sequence for processing I/O requests, according to a second request processing sequence determining method.

FIG. 10 shows an overview of a processing flow implemented by the command control section 102 when determining a sequence for processing I/O requests, according to a second request processing sequence determining method.

The command control section 102 starts processing for a particular I/O request (S101). Thereupon, the command control section 102 stores the timing at which the I/O request started, as a time stamp (for example, it records same in the buffer 109).

Next, the command control section 102 checks the time period that has elapsed from the start of processing of that I/O request (S102). The processing in S102 is carried out at a prescribed timing (for example, at a uniform interval).

If, as a result of the check in S102, the elapsed time period is equal to or less than a previously determined elapsed period threshold value S2 (Y at S102), then the command control section 102 continues processing of the I/O request (S106).

If, on the other hand, as a result of the check at S102, the elapsed time period exceeds the threshold value S2 (N at S103), then the command control section 102 decides whether to continue processing the current I/O request, or whether to switch to processing of another I/O request (S103). Stated alternatively, the command control section 102 checks whether or not there is another I/O request which it would be desirable to process straight away, in preference to the I/O request currently being processed.

At S103, if it is decided that the processing is not to be switched (N at S103), then the command control section 102 continues the processing of the I/O request currently being executed.

However, if it is decided at S103 that processing is to be switched (Y at S103), then the command control section 102 determines a request processing sequence for the I/O requests to be executed by switching processing (S104).

Similarly to the method described with respect to FIG. 8 and FIG. 9, for example, this request processing sequence involves calculating the total of the estimated values of the response times of M I/O requests that are to be executed, and then determining the request processing sequence for the M I/O requests so that the sequence starts from the smallest of the M totals of estimated values thus calculated.

Thereupon, the command control section 104 starts processing of the plurality of I/O requests that are to be executed, in accordance with the request processing sequence thus determined (S105).

The foregoing is an overview of a processing flow for the command control section 102 based on a second method for determining the request processing sequence. In this processing flow, the threshold value S2 is a threshold for the length of time for which one I/O request is processed continuously.

In the storage control device 10, if a second I/O request which can be expected to be processing in a relatively short period of time is received during the processing of a first I/O request which will take a relatively long period of time until the processing thereof is completed, then if the processing of the first I/O request is continued for a long time, the average response time for the first and second I/O requests will become longer, as can be seen from the third consideration mentioned previously.

Therefore, in order to avoid such a situation, in the second request processing sequence determining method, a threshold value S2 is established for the elapsed time from the start of processing of an I/O request, and when the elapsed time has exceeded this threshold S2, the command control section 102 checks whether or not there is present another I/O request which it would be desirable to process immediately, in preference to the I/O request currently being processed. Thereby, it is possible to avoid deterioration of the I/O response time of a second I/O request which has a short processing time, due to a first I/O request which takes a long processing time, and furthermore, it is also possible to avoid deterioration of the average response time of the first and second I/O requests.

FIG. 11 shows a specific processing sequence for step S103 in the processing sequence illustrated in FIG. 10.

The command control section 102 checks whether or not an I/O request that is awaiting processing is stored in the I/O request buffer 109, and if an I/O request awaiting processing is stored, then the total of the estimated values of the I/O response time for that one or more than one I/O request is calculated by using the performance information table 1060 (and/or the statistical information table 1061), and from the estimated value totals thus calculated, it is judged whether or not there is an I/O request having an estimated value total that is less than a threshold value S3 previously established in the I/O request buffer 109 (S131).

At S1031, if there is an I/O request having an estimated value total that is less than the threshold value S3 (Y at S1031), then the command control section 102 selects that I/O request as the I/O request forming the element for determining the request processing sequence (S1032), whereupon step S103 terminates (S1033).

If, on the other hand, at S1031, there is no I/O request awaiting processing in the I/O request buffer 109, or if there is no I/O request having an estimated value total that is smaller than the threshold value S3, then the command control section 102 determines in step S103 that processing should not be switched to another I/O request, whereupon step S103 terminates (S1033).

In this processing sequence, the threshold value S3 is a previously determined threshold value. Even if the I/O request currently being executed will take a processing time exceeding the threshold value S2, this does not necessarily means that the average response time will be shortened if the processing is switched randomly to another I/O request. When the I/O processing currently being executed exceeds threshold value S2, then only if the processing for another I/O request would be completed within a relatively short time, were the processing to be switched to that I/O request, is the objective of increasing the average response time of the plurality of I/O requests actually achieved. Therefore, according to the method described with reference to FIG. 11, it is judged whether or not the I/O request processing currently being executed is to be changed to processing of another I/O request.

Above, according to the foregoing embodiment, a processing sequence different from the reception sequence is determined, on the basis of the plurality of command elements (commands or data) contained in two or more received I/O requests, in such a manner that the average response time for these two or more I/O requests becomes less than the value that would be obtained if the two or more I/O requests were to be processed in the order in which they were received, and processing of the aforementioned plurality of command elements is started on the basis of the determined processing sequence. Thereby, it is possible to shorten the average response time for the two or more I/O requests beyond the average response time obtained if processing were to be carried out simply in the reception sequence.

In the foregoing description, the channel control section 101, I/O request buffer 109 and the command control section 102 receiving I/O requests issued by the host 20 were described in detail, but the other channel control section 104, I/O request buffer 110 and command control section 105 also function in a substantially similar manner.

Moreover, in the embodiment described above, for example, it is possible for the command control section 102 to start processing for determining (or changing) the request processing sequence at a variety of timings (for example, at least either when there is a cache hit, and/or when there is a cache miss).

Moreover, in the embodiment described above, the prescribed variety of values (for example, K, Q and at least one of the threshold values S1–S3) are established as suitable values on the basis of various information, such as the time loss occurring when switching the I/O request being processed. Moreover, once set, these values may be set to be unchangeable once after the storage control device 10 has been started up, or they may be set to be changeable by internal tuning, or the like, of the storage control device 10.

Furthermore, in the embodiment described above, for example, the constituent element in the storage control device 10 for determining the request processing sequence is not limited to being the command control section 102, 105, and this decision may be carried out by another constituent element thereof.

Moreover, in the embodiment described above, for example, when the command control section 102 judges whether or not to switch processing to another I/O request, during processing of a particular I/O request, then it may make this judgment on the basis of the remaining length of time that it is estimated the I/O request in question will take until processing thereof is completed. Moreover, when the request processing sequence is determined, for example, it is possible to make this decision on the basis of this remaining length of time. Moreover, this remaining length of time may be found by the command control section 102 calculating the total of the estimated values for one or more unprocessed command elements, relating to the I/O request being processed, on the basis of the attributes of the one or more unprocessed command elements.

Furthermore, in the embodiment described above, the processing sequence is determined in I/O request units, and one process is carried out in I/O request units, but instead of this, for example, it is possible for a processing sequence to be determined in units of the command elements of the I/O requests, and for the command elements to be processed in this sequence. More specifically, for example, if a first I/O request contains a first and second command element, and if a second I/O request contains a third and fourth command element, then in the embodiment described above, after processing has been carried out for the first and second command elements, the third and fourth command elements are carried out, but in this modification example, it is possible to determine a request processing sequence whereby the command elements are processed in the sequence: first, third, second and fourth elements. According to the second consideration described above, this method may make it difficult to improve the average response time, but if, for example, a command element having a very short processing time is received for another I/O request, whilst a command element having a very long processing time is being processed for a first I/O request, then it will be possible to shorten the average response time by processing this very small command element first.

In a further modification of this modification example, there is a first information processing mode in which the request processing sequence is determined in information set units (for example, I/O request units), and a second information processing mode in which the request processing sequence is determined in information element units (for example, command element units), these two information processing modes being used selectively on the basis of a prescribed mode selection method. More specifically, for example, if the desired information processing mode is notified to the storage control device 10 by the host 20 issuing the information set, then the storage control device 10 can determine a request processing sequence on the basis of the information processing mode thus reported by the host. Moreover, for example, if there is a plurality of information sets (I/O requests) for which all the information elements (command elements) are recorded in the buffer 109, then the command control section 102 may determine the processing sequence in information set units for this plurality of information sets, and if there is a plurality of other information sets for which only a portion of the information elements have been recorded, then a processing sequence is determined in information element units for this plurality of other information sets. Furthermore, for example, the storage control device 10 may store various information that is valuable for increasing the average response time, such as length of time information relating to the losses incurred when switching the I/O request being processed, and the like, and the request processing sequence for two or more information sets, or for the plurality of information elements contained therein, may be determined by means of a desired request processing sequence determining method, at a desired timing (for example, after a fixed time period has elapsed after the start of processing of a certain information set or a certain information element), on the basis of this information. If a request processing sequence is determined in information element units, then the sequence may be recorded in the buffer 109, for each information element. Furthermore, the determined request processing sequence is, for example, a sequence different from the sequence in which the information sets or information elements were received, being a sequence which produces a shorter average response time than the average response time obtained if the information sets or elements where to be processing in the order in which they were received.

Above, a preferred embodiment and modifications of the present invention were described, but there are simply examples for the purpose of describing the present invention and the scope of the present invention is not limited to this embodiment and these modifications alone. The present invention may be implemented in various further modes.

For example, the expected value described above may be the expected value for the length of time required for processing to be carried out in the storage control device 10, rather than the expected value for the response time. Moreover, the communications protocol which allows data or commands to be transmitted by the host in a pipeline fashion, without interlocking, (for example, the FC-SB2 protocol), is, in other words, a protocol for communications between the host and the storage sub-system (system including the storage device 60 and the storage control device 10) whereby the host is able to issue I/O requests each constituted by a chain of a plurality of commands and data elements, to the storage system, asynchronously with respect to the responses from the storage sub-system.

Moreover, according to a first preferred embodiment of the present invention, for example, the determining component acquires (for example, calculates) expected values relating to the length of time that processing is expected to take for each of the two or more information sets, on the basis of the plurality of information elements, and determines the processing sequence on the basis of the expected values thus acquired.

Moreover, for example, according to a second preferred embodiment of the present invention, in the first preferred embodiment described above, the information processing device further comprises a subsidiary expected value storing component for storing subsidiary expected value information indicating subsidiary expected values relating to the length of time that processing is expected to take for information elements having certain information element attributes, for each of a plurality of information element attributes relating to the information elements. In this case, the determining component acquires the respective information element attributes of the plurality of information elements, and the subsidiary expected values for each of the plurality of information elements, on the basis of the stored subsidiary expected value information, and acquires the expected values for each of the two or more information sets, by using the subsidiary expected values thus acquired. Here, "information element attribute" includes at least one item of: the type of information element, the data size, and/or the issuing source, for example.

Moreover, according to a third preferred embodiment of the present invention, in the second preferred embodiment described above, the determining component determines the processing sequence, in which processing is carried out in sequence starting from the information element or information set having the smallest subsidiary expected value thus acquired.

Furthermore, according to a fourth preferred embodiment of the present invention, in the first preferred embodiment described above, the determining component acquires the expected values for each of the two or more information sets, on the basis of the attributes of information elements processed in the past by the information processing component, and information relating to the history of the length of time taken to process those information elements.

Moreover, according to a fifth preferred embodiment of the present invention, the determining component determines the processing sequence, in which the smallest value is obtained of the plurality of values relating to the average corresponding respectively to a plurality of processing sequences for the plurality of information elements.

Furthermore, according to a sixth preferred embodiment of the present invention, the determining component acquires the differential between the smallest and largest value of the processing times, for the two or more information sets, and executes processing for determining the processing sequence if the differential is equal to or greater than a prescribed value.

Moreover, according to a seventh preferred embodiment of the present invention, if the plurality of information elements includes an information element that is being processed by the information processing component, then the determining component determines the processing sequence on the basis of the remaining length of time of the processing time taken to process that information element.

Furthermore, according to an eighth preferred embodiment of the present invention, the information processing device further comprises a completion signal transmitting component for transmitting a completion signal indicating that processing has been completed, to the information set source that issued an information set, when processing for that information set has been completed. In this case, the length of processing time for the information set is a length of time relating to the response time from the issuing of the information set by the information set source until the reception of the completion signal by same.

Moreover, according to a ninth preferred embodiment of the present invention, for example, the determining component executes processing for determining the processing sequence, in cases where the reception status of the received two or more information sets is a prescribed status (for example, if the number of received information sets is equal to or greater than a prescribed number). If this is not the case, for example, then the determining component determines that the information processing device is to continue processing of the information set or information element currently being processed, or alternatively, is to carry out processing of the information sets or information elements in the sequence in which they were received.

Furthermore, for example, in a tenth preferred embodiment of the present invention, the determining component identifies the elapsed length of time from the start of processing for the information set or the information element, until a prescribed time, and executes processing for determining the processing sequence, if the elapsed length of time has exceeded a prescribed length of time. More specifically, for example, the determining component acquires the aforementioned estimated value for one or a plurality of information sets or two or more information elements for which the aforementioned elapsed length of time has exceeded the prescribed length of time, and it executes processing for determining the processing sequence, if one of the estimated values thus acquired is smaller than a prescribed threshold value. If these conditions are not satisfied, then the determining component, for example, determines that the information processing device is to continue processing the information set or information element currently being processed, or alternatively, that it is to carry out processing of the information sets or information elements in the sequence in which they were received.

Furthermore, for example, in an eleventh preferred embodiment of the present invention, the information processing device is able to communicated with one or a plurality of storage devices, in a communicable fashion. The receiving component receives information elements contained in respective I/O requests having one or more information elements, from one or a plurality of I/O request sources issuing the I/O requests. The information processing component carries out processing for reading data from the storage device and transmitting same to the I/O request source, or writing data from the I/O request source to the storage device, on the basis of the information elements contained in the I/O request thus received. The Determining component determines a processing sequence for the two or more I/O requests or the plurality of information elements, on the basis of the plurality of information elements that are unprocessed or currently being processed, contained in two or more I/O requests thus received, and determines a processing sequence different from the reception sequence, in which a value relating to the average of the response time for the two or more I/O requests becomes equal to or less than the value that would be obtained were the plurality of information elements or the two or more I/O requests to be processed according to their reception sequence.

What is claimed is:

1. An information processing device comprising:
  a receiving component receiving information elements contained in respective information sets having one or more information elements, from one or a plurality of information set sources issuing said information sets;
  an information processing component carrying out processing of said information elements thus received; and
  a determining component determining a processing sequence for said two or more information sets or said plurality of information elements, on the basis of the plurality of information elements that are unprocessed or currently being processed, contained in two or more information sets thus received, and determining a processing sequence different from a reception sequence, in which a value relating to the average of the length of processing time for said two or more information sets becomes equal to or less than the value that would be obtained were said plurality of information elements or said two or more information sets to be processed in accordance with the reception sequence thereof;
  wherein said information processing component starts processing of the plurality of information elements that are unprocessed or currently being processed, on the basis of the processing sequence thus determined.

2. The information processing device according to claim 1, wherein said determining component acquires expected values relating to the length of time that processing is expected to take, for respective said two or more information sets, on the basis of said plurality of information elements, and determines said processing sequence on the basis of the expected values thus acquired.

3. The information processing device according to claim 2, further comprising:
  a subsidiary expected value storing component storing subsidiary expected value information indicating subsidiary expected values relating to the length of time that processing is expected to take for information elements having certain information element attributes, for each of a plurality of information element attributes relating to the information elements;
wherein said determining component acquires said subsidiary expected values for each of said plurality of information elements, on the basis of the respective information element attributes of said plurality of information elements and said stored subsidiary expected value information, and acquires said expected values for each of said two or more information sets, by using the subsidiary expected values thus acquired.

4. The information processing device according to claim 3, wherein said determining component determines said processing sequence, in which processing is carried out in sequence starting from the information element or information set having the smallest subsidiary expected value thus acquired.

5. The information processing device according to claim 2, wherein said determining component acquires said expected values for each of said two or more information sets, on the basis of the attributes of information elements processed in the past by said information processing component, and information relating to the history of the length of time taken to process those information elements.

6. The information processing device according to claim 1, wherein said determining component determines said processing sequence, in which the smallest value is obtained of the plurality of values relating to said average corresponding respectively to a plurality of said processing sequences for said plurality of information elements.

7. The information processing device according to claim 1, wherein said determining component acquires the differential between the smallest and largest value of said processing time lengths, for said two or more information sets, and executes processing for determining said processing sequence if said differential is equal to or greater than a prescribed value.

8. The information processing device according to claim 1, wherein, if said plurality of information elements include an information element that is being processed by said information processing component, then said determining component determines said processing sequence on the basis of the remaining length of time of the processing time taken to process the information element.

9. The information processing device according to claim 1, further comprising a completion signal transmitting component transmitting a completion signal indicating that processing has been completed, to the information set source that issued an information set, when processing for the information set has been completed;
wherein said length of processing time for said information set is a length of time relating to the response time from the issuing of said information set by said information set source until the reception of said completion signal by same.

10. The information processing device according to claim 1, wherein said determining component executes processing for determining said processing sequence, in cases where a reception status of said received two or more information sets is a prescribed status.

11. The information processing device according to claim 1, wherein said determining component identifies the elapsed length of time from the start of processing for said information set or said information element, until a prescribed time, and executes processing for determining said processing sequence, if said elapsed length of time has exceeded a prescribed length of time.

12. A storage control apparatus comprising:
a storage control device capable of connecting to one or a plurality of physical or logical storage devices;
a receiving component receiving information elements contained in respective I/O requests having one or more information elements, from one or a plurality of I/O request sources issuing said I/O requests;
an information processing component carrying out processing for reading data from said storage device and transmitting same to the I/O request source, or writing data from said I/O request source to said storage device, on the basis of the information elements contained in said I/O request thus received; and
a determining component determining a processing sequence for said two or more I/O requests or said plurality of information elements, on the basis of the plurality of information elements that are unprocessed or currently being processed, contained in two or more I/O requests thus received, and determining a processing sequence different from a reception sequence, in which a value relating to the average of the response time for said two or more I/O requests becomes equal to or less than the value that would be obtained were said plurality of information elements or said two or more I/O requests to be processed according to the reception sequence thereof.

13. An information processing method comprising:
receiving information elements contained in respective information sets having one or more information elements, from one or a plurality of information set sources issuing said information sets;
carrying out processing of said information elements thus received; and
determining a processing sequence for said two or more information sets or said plurality of information elements, on the basis of the plurality of information elements that are unprocessed or currently being processed, contained in two or more information sets thus received, and determining a processing sequence different from a reception sequence, in which a value relating to the average of the response time for said two or more information sets becomes equal to or less than the value that would be obtained were said plurality of information elements or said two or more information sets to be processed in accordance with the reception sequence thereof;
wherein, in said processing of said information elements, the processing of a plurality of information elements that are unprocessed or currently being processed is started on the basis of the element processing sequence thus determined.

14. A computer-readable storage medium having a computer program comprising:
code for receiving information elements contained in respective information sets having one or more information elements, from one or a plurality of information set sources issuing said information sets;
code for carrying out processing of said information elements thus received; and
code for determining a processing sequence for said two or more information sets or said plurality of information elements, on the basis of the plurality of information elements that are unprocessed or currently being processed, contained in two or more information sets thus received, and determining a processing sequence different from a reception sequence, in which a value relating to the average of the response time for said two or more information sets becomes equal to or less than the value that would be obtained were said plurality of information elements or said two or more information sets to be processed in accordance with the reception sequence thereof;

wherein, in said processing of said information elements, the processing of a plurality of information elements that are unprocessed or currently being processed is started on the basis of the element processing sequence thus determined.

15. The information processing method according to claim 13, wherein said determining comprises acquiring expected values relating to the length of time that processing is expected to take, for respective said two or more information sets, on the basis of said plurality of information elements, and determining said processing sequence on the basis of the expected values thus acquired.

16. The information processing method according to claim 15, further comprising:

storing component storing subsidiary expected value information indicating subsidiary expected values relating to the length of time that processing is expected to take for information elements having certain information element attributes, for each of a plurality of information element attributes relating to the information elements;

wherein said determining comprises acquiring said subsidiary expected values for each of said plurality of information elements, on the basis of the respective information element attributes of said plurality of information elements and said stored subsidiary expected value information, and acquiring said expected values for each of said two or more information sets, by using the subsidiary expected values thus acquired.

17. The information processing method according to claim 16, wherein said determining comprises determining said processing sequence, in which processing is carried out in sequence starting from the information element or information set having the smallest subsidiary expected value thus acquired.

18. The information processing method according to claim 15, wherein said determining comprises acquiring said expected values for each of said two or more information sets, on the basis of the attributes of information elements processed in the past by said information processing component, and information relating to the history of the length of time taken to process those information elements.

19. The information processing method according to claim 13, wherein said determining comprises determining said processing sequence, in which the smallest value is obtained of the plurality of values relating to said average corresponding respectively to a plurality of said processing sequences for said plurality of information elements.

20. The information processing method according to claim 13, wherein said determining comprises acquiring the differential between the smallest and largest value of said processing time lengths, for said two or more information sets, and executing processing for determining said processing sequence if said differential is equal to or greater than a prescribed value.

21. A storage control apparatus comprising:

a storage control device capable of connecting to one or a plurality of physical or logical storage devices;

a receiving component receiving information elements contained in respective I/O requests having one or more information elements, from one or a plurality of I/O request sources issuing said I/O requests;

an information processing component carrying out processing for reading data from said storage device and transmitting same to the I/O request source, or writing data from said I/O request source to said storage device, on the basis of the information elements contained in said I/O request thus received;

a determining component determining a processing sequence for said two or more I/O requests or said plurality of information elements, on the basis of the plurality of information elements that are unprocessed or currently being processed, contained in two or more I/O requests thus received, and determining a processing sequence different from a reception sequence, in which a value relating to the average of the response time for said two or more I/O requests becomes equal to or less than the value that would be obtained were said plurality of information elements or said two or more I/O requests to be processed according to the reception sequence thereof;

a subsidiary expected value storing component storing subsidiary expected value information indicating subsidiary expected values relating to the length of time that processing is expected to take for information elements having certain information element attributes, for each of a plurality of information element attributes relating to the information elements; wherein said determining component acquires said subsidiary expected values for each of said plurality of information elements, on the basis of the respective information element attributes of said plurality of information elements and said stored subsidiary expected value information, and acquires said expected values for each of said two or more information sets, by using the subsidiary expected values thus acquired; and a completion signal transmitting component transmitting a completion signal indicating that processing has been completed, to the information set source that issued an information set, when processing for the information set has been completed; wherein said length of processing time for said information set is a length of time relating to the response time from the issuing of said information set by said information set source until the reception of said completion signal by same.

* * * * *